United States Patent
Kim et al.

(10) Patent No.: US 10,932,239 B2
(45) Date of Patent: Feb. 23, 2021

(54) UPLINK DATA TRANSMISSION METHOD IN WIRELESS COMMUNICATION SYSTEM SUPPORTING NON-LICENSED BAND AND DEVICE SUPPORTING SAME

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Changhwan Park, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 16/328,656

(22) PCT Filed: Sep. 5, 2017

(86) PCT No.: PCT/KR2017/009689
§ 371 (c)(1),
(2) Date: Feb. 26, 2019

(87) PCT Pub. No.: WO2018/048172
PCT Pub. Date: Mar. 15, 2018

(65) Prior Publication Data
US 2020/0404648 A1 Dec. 24, 2020

Related U.S. Application Data

(60) Provisional application No. 62/384,155, filed on Sep. 6, 2016, provisional application No. 62/413,444, filed (Continued)

(51) Int. Cl.
*H04W 72/04* (2009.01)
*H04W 72/12* (2009.01)
(Continued)

(52) U.S. Cl.
CPC ....... *H04W 72/0413* (2013.01); *H04L 5/0048* (2013.01); *H04W 16/14* (2013.01); *H04W 72/0446* (2013.01); *H04W 72/12* (2013.01)

(58) Field of Classification Search
CPC . H04W 72/0413; H04W 72/12; H04W 16/14; H04W 72/0446; H04L 5/0048
See application file for complete search history.

(56) References Cited

U.S. PATENT DOCUMENTS

2013/0258975 A1 10/2013 Krishnamurthy et al.
2017/0223687 A1* 8/2017 Kuchibhotla ......... H04L 5/0094
(Continued)

FOREIGN PATENT DOCUMENTS

WO 2016021958 A1 2/2016

OTHER PUBLICATIONS

Nokia, Alcatel-Lucent Shanghai Bell, "On remaining scheduling aspects for eLAA", 3GPP TSG-RAN WG1 Meeting #86, Aug. 22-26, 2016, R1-167073, XP051125684.
(Continued)

*Primary Examiner* — Brian D Nguyen
(74) *Attorney, Agent, or Firm* — Dentons US LLP

(57) ABSTRACT

The present disclosure discloses: an uplink data transmission method for a terminal; and a device supporting same. More specifically, the present disclosure discloses: a method for transmitting uplink data from a terminal to a base station through a non-licensed band in a wireless communication system supporting the non-licensed band; and a device supporting same.

18 Claims, 14 Drawing Sheets

Related U.S. Application Data on Oct. 27, 2016, provisional application No. 62/459,472, filed on Feb. 15, 2017, provisional application No. 62/490,609, filed on Apr. 27, 2017.

(51) Int. Cl.
*H04W 16/14* (2009.01)
*H04L 5/00* (2006.01)

(56) References Cited

U.S. PATENT DOCUMENTS

| | | | |
|---|---|---|---|
| 2017/0290008 A1* | 10/2017 | Tooher | H04L 1/0007 |
| 2018/0176000 A1* | 6/2018 | Lee | H04L 5/16 |
| 2018/0241464 A1* | 8/2018 | Michaels | H04B 7/18513 |
| 2019/0090221 A1* | 3/2019 | Nigam | H04W 72/042 |
| 2020/0045698 A1* | 2/2020 | Kim | H04L 5/0091 |

OTHER PUBLICATIONS

Samsung, "Discussion on two-step UL grant scheduling", 3GPP TSG RAN WG1 Meeting #86, Aug. 22-26, 2016, R1-166691, XP051132866.

Qualcomm Incorporated, "Maximum timing advance assumption for LAA and relation to UL grants", 3GPP TSG RAN WG1 #87, Nov. 14-28, 2016, R1-1611579, XP051175554.

Qualcomm Incorporated, Change Request, "Draft CR for maximum timing advance assumptions for LAA and relation to UL grants", 3GPP TSG-RAN Meeting #87, Nov. 10-14, 2016, R1-1611580, XP051175555.

R1-166129: 3GPP TSG RAN WG1 Meeting #86, Gothenburg, Sweden, Aug. 22-26, 2016, Huawei, HiSilicon, "Details on timing advance for SRS on TDD CCs without PUSCH," pp. 1-3.

R1-166137: 3GPP TSG RAN WG1 Meeting #86, Gothenburg, Sweden, Aug. 22-26, 2016, Huawei, HiSilicon, "Two-stage scheduling for eLAA," pp. 1-5.

R1-167074: 3GPP TSG RAN WG1 Meeting #86, Gothenburg, Sweden, Aug. 22-26, 2016, Nokia, Alcatel-Lucent Shanghai Bell, "On Two-Stage UL scheduling for eLAA," pp. 1-7.

* cited by examiner

UPLINK DATA TRANSMISSION METHOD IN WIRELESS COMMUNICATION SYSTEM SUPPORTING NON-LICENSED BAND AND DEVICE SUPPORTING SAME

This application is a National Stage Application of International Application No. PCT/KR2017/009689, filed on Sep. 5, 2017, which claims the benefit of U.S. Provisional Application No. 62/384,155, filed on Sep. 6, 2016, 62/413,444, filed on Oct. 27, 2016, 62/459,472, filed on Feb. 15, 2017 and 62/490,609, filed on Apr. 27, 2017, all of which are hereby incorporated by reference in their entirety for all purposes as if fully set forth herein.

TECHNICAL FIELD

The following description relates to a wireless communication system supporting an unlicensed band and to a method of transmitting uplink data by a user equipment to a base station in the wireless communication system supporting the unlicensed band and apparatuses supporting the same.

More particularly, the following description proposes various factors taken into consideration when uplink data transmission is scheduled based on a plurality of uplink grants due to characteristics of the unlicensed band and includes an explanation of a UL data transmission method of a user equipment based on the proposed factors and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have required higher communication capacity, a proposal for an operation of each communication device in an unlicensed band which is accessible based on contention has been demanded.

DETAILED DESCRIPTION OF THE INVENTION

Technical Problems

An object of the present disclosure is to provide a method of transmitting uplink data by a user equipment to a base station in a wireless communication system supporting an unlicensed band and an apparatus therefor.

Particularly, an object of the present disclosure is to provide in detail various factors taken into consideration when uplink data transmission is scheduled based on a plurality of uplink grants due to characteristics of the unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method and apparatuses for transmitting uplink data by a user equipment to a base station in a wireless communication system supporting an unlicensed band.

According to an aspect of the present disclosure, provided herein is a method of transmitting uplink (UL) data by a user equipment (UE) in a wireless communication system supporting an unlicensed band, including: receiving scheduling information for UL data transmission, wherein the scheduling information includes first offset information received in a first subframe, second offset information received in a second subframe other than the first subframe, and starting position information of UL data transmission; determining a maximum timing advance (TA) value for the UE based on the first offset information, the second offset information, and the starting position information of the UL data transmission; and performing the UL data transmission through the unlicensed band or dropping the UL data transmission, at a starting position indicated by the starting position information of UL data transmission within a third subframe, based on a result of comparing the maximum TA value with a TA value configured for the UE, wherein the third subframe is determined based on the first offset information and the second offset information.

In another aspect of the present disclosure, provided herein is a user equipment (UE) for transmitting uplink (UL) data in a wireless communication system supporting an unlicensed band, including: a transmitter; a receiver; and a processor connected to the transmitter and the receiver to perform an operation, wherein the processor is configured to: receive scheduling information for UL data transmission, the scheduling information including first offset information received in a first subframe, second offset information received in a second subframe other than the first subframe, and starting position information of the UL data transmission; determine a maximum timing advance (TA) value for the UE based on the first offset information, the second offset information, and the starting position information of the UL data transmission; and perform the UL data transmission through the unlicensed band or drop the UL data transmission, at a starting position indicated by the starting position information of the UL data transmission within a third subframe, based on a result of comparing the maximum TA value with a TA value configured for the UE, the third subframe being determined based on the first offset information and the second offset information.

The UL data may be a physical uplink shared channel (PUSCH).

The starting position information of the UL data transmission may indicate, as a starting position of UL data transmission, one of symbol #0 boundary, symbol #0 boundary+25 µs, symbol #0 boundary+25 µs+TA value configured for the UE, and symbol #1 boundary.

The third subframe may be a subframe after a time duration corresponding to the sum of a value indicated by the first offset information and a value indicated by the second offset information, based on the second subframe.

The maximum TA value for the UE may be differently determined according to a time length from the second subframe to the starting position indicated by the starting position information of UL data transmission within the third subframe.

As the time length from the second subframe to the starting position indicated by the starting position information of UL data transmission within the third subframe increases, the maximum TA for the UE may have a large value.

If the maximum TA value is greater than or equal to the TA value configured for the UE, the UE may perform the UL data transmission at the starting position indicated by the starting position information of UL data transmission within the third subframe, and if the maximum TA value is less than the TA value configured for the UE, the UE may drop the UL data transmission at the starting position indicated by the starting position information of the UL data transmission within the third subframe.

The sum of a value indicated by the first offset information and a value indicated by the second offset information may be greater than or equal to 1 and less than or equal to 3.

If the UL data transmission is dropped based on the result of comparing the maximum TA value with the TA value configured for the UE although sounding reference signal (SRS) transmission has been scheduled together with UL data transmission, the UE may perform scheduled SRS transmission regardless of dropping of UL data transmission.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, the UE can perform uplink data transmission adapted to an uplink scheduling condition in a wireless communication system supporting to an unlicensed band.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

MODE FOR CARRYING OUT THE INVENTION

Figure 1:
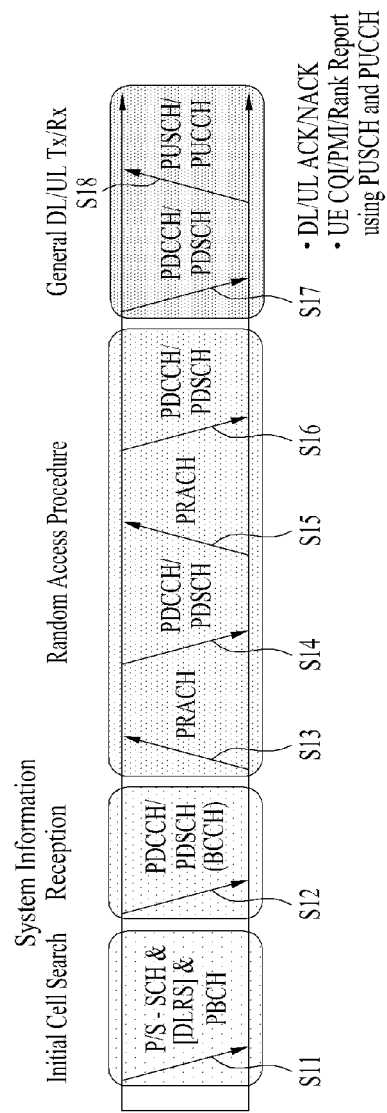
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1 Overview

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ- ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
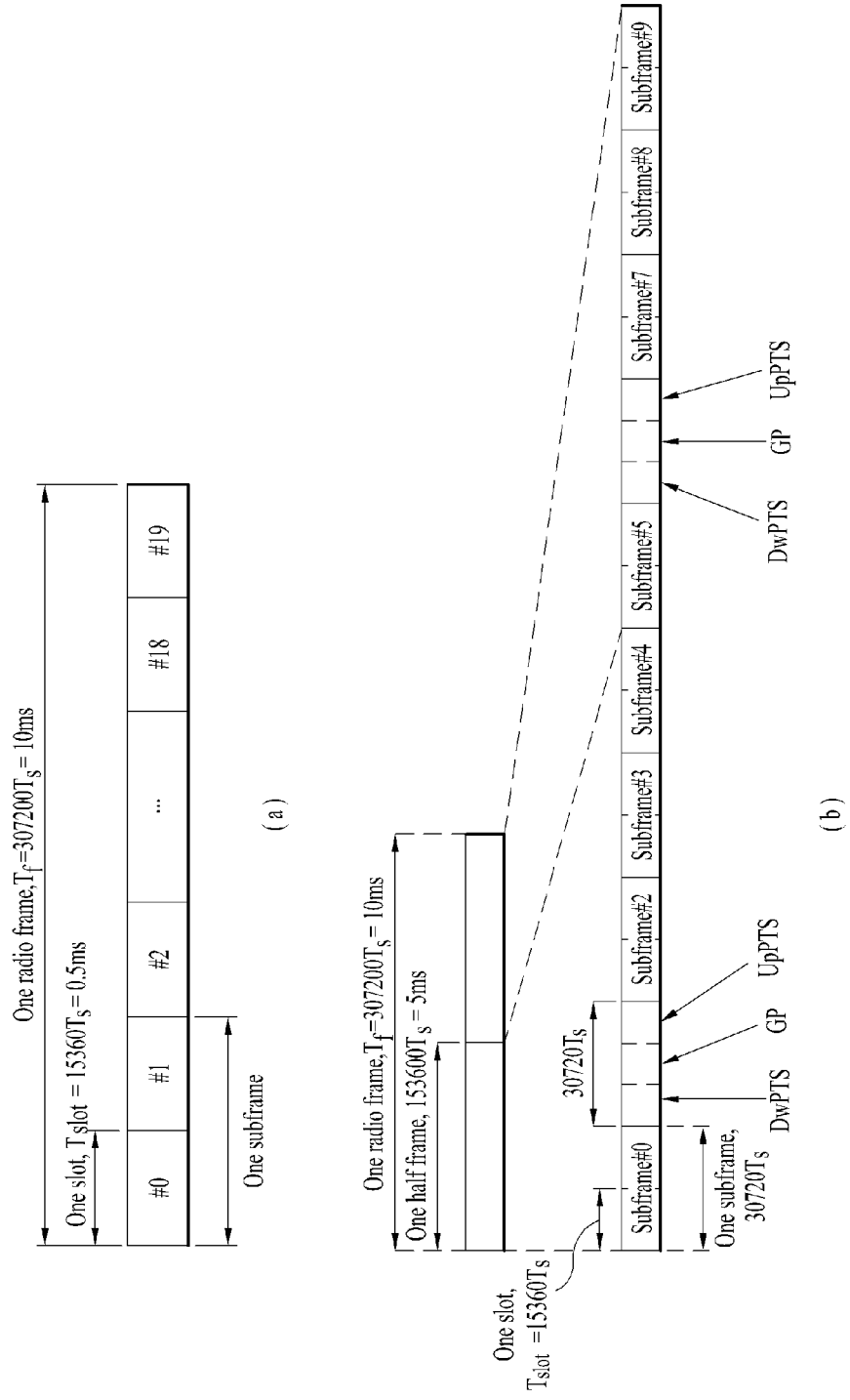
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
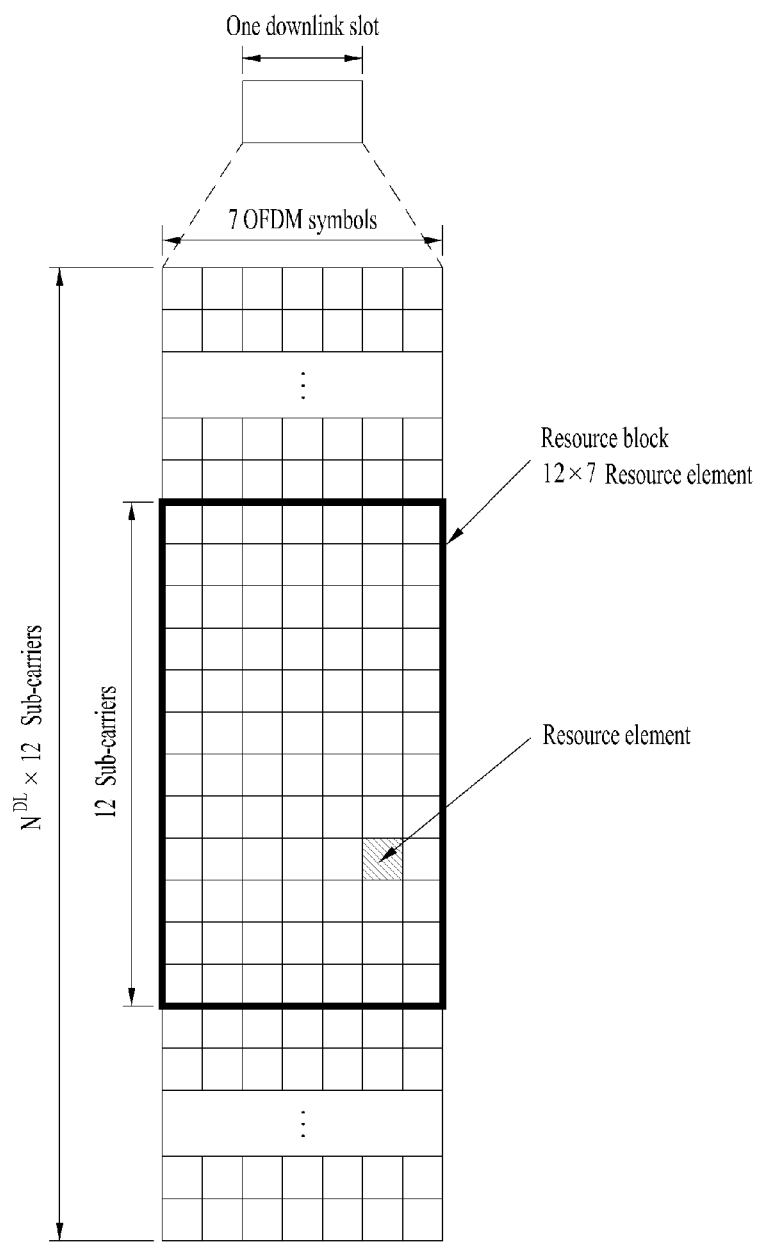
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
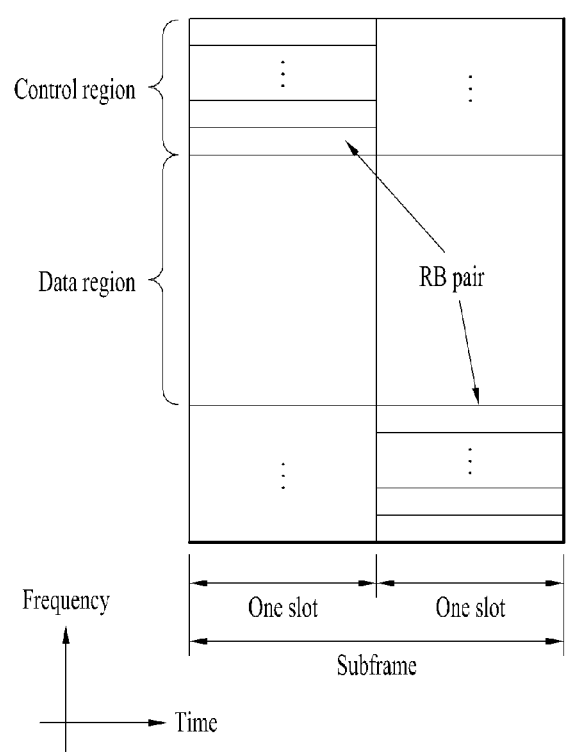
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
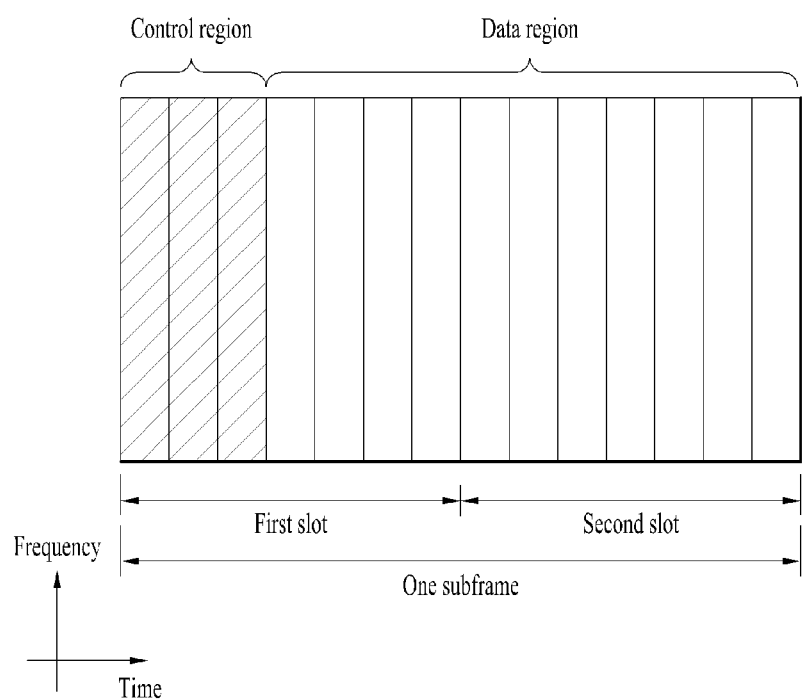
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2. CSI Reporting

In the 3GPP LTE (-A) system, a UE is defined to report CSI to a BS (eNB). Herein, the CSI means information indicating the quality of a radio channel (also called a link) created between a UE and an antenna port. The CSI includes, for example, a Rank Indicator (RI), a Precoding Matrix Indicator (PMI), and a Channel Quality Indicator (CQI). Herein, the RI, which indicates rank information of a channel, means the number of streams that a UE receives on the same time-frequency resource. The RI value is determined depending on long-term fading of the channel, and thus it is usually fed back to the BS by the UE with a longer periodicity than that of the PMI or CQI. The PMI is a value reflecting the channel space property and indicates a precoding index preferred by the UE based on a metric such as a signal-to-interference-plus-noise ratio (SINR). The CQI is a value indicating the intensity of a channel and typically indicates a received SINR obtained when the BS uses the PMI.

Based on measurement of the radio channel, the UE calculates a preferred PMI and RI, which is capable of deriving the optimal or highest transmission rate when used by the BS, in the current channel state and feeds back the calculated PMI and RI to the BS. Herein, the CQI refers to a modulation and coding scheme of providing an acceptable packet error probability for the fed-back PMI/RI.

The LTE-A system, where accurate MU-MIMO and explicit CoMP operations are expected, may not sufficiently support new operations due to the CSI feedback defined in LTE. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

Table 2 below shows uplink channels used for CSI transmission in the 3GPP LTE (-A) system.

TABLE 2

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 2, CSI may be transmitted using a Physical Uplink Control Channel (PUCCH) with a periodicity defined in higher layers. Depending on whether it is needed by a scheduler, the CSI may be aperiodically transmitted using a Physical Uplink Shared Channel (PUSCH). Transmission of the CSI over the PUSCH is possible only in the case of frequency selective scheduling and aperiodic CSI transmission. Hereinafter, CSI transmission schemes according to scheduling schemes and periodicities will be described.

1) Transmission of CQI/PMI/RI on PUSCH after Reception of a CSI Transmission Request Control Signal (CSI Request)

A PUSCH-scheduling control signal (UL grant) transmitted as a PDCCH signal may include a control signal for requesting CSI transmission. Table 3 below shows UE modes for transmitting the CQI, PMI and RI on the PUSCH.

TABLE 3

| | | PMI Feedback Type | | |
|---|---|---|---|---|
| | | No PMI | Single PMI | Multiple PMIs |
| PUSCH CQI Feed back Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
| | UE selected (Subband CQI) | Mode 2-0 RI (only for Open-loop SM) 1st wideband CQI(4 bit) + Best-M CQI(2 bit) (Best-M CQI: Average CQI of M SBs selected from | | Mode 2-2 RI 1st wideband CQI(4 bit) + Best-M CQI(2 bit) 2nd wideband CQI(4 bit) + Best-M CQI(2 bit) if RI > 1 * Best-M index (L bit) |

TABLE 3-continued

| | PMI Feedback Type | | |
|---|---|---|---|
| | No PMI | Single PMI | Multiple PMIs |
| | among N SBs in total) Best-M index (L bit) | | Wideband PMI(4 bit)+ Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes of Table 3 are selected by higher layers, and the CQI/PMI/RI are all transmitted in a PUSCH subframe. Hereinafter, uplink transmission methods performed by a UE in the individual modes will be described.

Mode 1-2 represents a case where precoding matrices are selected on the assumption that data is transmitted only in subbands. A UE generates a CQI on the assumption that a precoding matrix is selected for the system band or the entirety of a band (set S) designated by higher layers. In Mode 1-2, the UE may transmit the CQI and a PMI value for each subband. In this case, the size of each subband may depend on the size of the system band.

In Mode 2-0, a UE may select M preferred subbands for the system band or band (set S) designated by higher layers. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI (WB-CQI) index.

The UE in mode 2-0 may transmit, to a BS, information on the locations of the M selected subbands, one CQI value for the M selected subbands, and a CQI value generated for the entire band or designated band (set S). In this case, the size of each subband and the value of M may depend on the size of the system band.

In Mode 2-2, a UE may simultaneously select locations of M preferred subbands and a single precoding matrix for the M preferred subbands on the assumption that data is transmitted through the M preferred subbands. In this case, a CQI value for the M preferred subbands is defined per codeword. In addition, the UE additionally generates a wideband CQI value for the system band or designated band (set S).

The UE in Mode 2-2 may transmit, to a BS, information on the locations of the M preferred subbands, one CQI value for the M selected subbands, a single PMI for the M preferred subbands, a wideband PMI, and a wideband CQI value. In this case, the size of a subband and the value of M may depend on the size of the system band.

In Mode 3-0, a UE generates a wideband CQI value. The UE generates a CQI value for each subband on the assumption that data is transmitted through each subband. In this case, even if an RI>1, the CQI value represents only the CQI value for the first codeword.

In Mode 3-1, a UE generates a single precoding matrix for the system band or designated band (set S). The UE generates a CQI subband for each codeword by assuming the single precoding matrix generated for each subband. In addition, the UE may generate a wideband CQI by assuming the single precoding matrix. The CQI value for each subband may be expressed in a differential form. The subband CQI value is calculated as a difference between subband CQI and wideband CQI indices. In this case, the size of each subband may depend on the size of the system band.

In Mode 3-2, a UE generates a precoding matrix for each subband instead of a single precoding matrix for the entire band, in contrast with Mode 3-1.

2) Periodic CQI/PMI/RI Transmission Through PUCCH

A UE may periodically transmit CSI (e.g., CQI/PMI/PTI (precoding type indicator) and/or RI information) to a BS on a PUCCH. If the UE receives a control signal instructing transmission of user data, the UE may transmit a CQI on the PUCCH. Even if the control signal is transmitted on a PUSCH, the CQI/PMI/PTI/RI may be transmitted in one of the modes defined in Table 4 below.

TABLE 4

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

A UE may operate in transmission modes shown in Table 4. Referring to Table 4, in Mode 2-0 and Mode 2-1, a Bandwidth Part (BP) may mean a set of consecutive subbands in the frequency domain and cover the system band or designated band (set S). In Table 3, the size of each subband, the size of a BP, and the number of BPs may depend on the size of the system band. In addition, the UE transmits CQIs for individual BPs in ascending order in the frequency domain in order to cover the system band or designated band (set S).

The UE may have the following PUCCH transmission types according to transmission combinations of CQI/PMI/PTI/RI.

i) Type 1: a subband CQI (SB-CQI) for Mode 2-0 and Mode 2-1 is transmitted.
ii) Type 1a: an SB CQI and a second PMI are transmitted.
iii) Types 2, 2b and 2c: a WB-CQI and PMI are transmitted.
iv) Type 2a: a WB PMI is transmitted.
v) Type 3: an RI is transmitted.
vi) Type 4: a WB CQI is transmitted.
vii) Type 5: an RI and a WB PMI are transmitted.
viii) Type 6: an RI and a PTI are transmitted.

When the UE transmits an RI and a WB CQI/PMI, the CQI/PMI are transmitted in subframes with different periodicities and offsets. If the RI needs to be transmitted in the same subframe as the WB CQI/PMI, the CQI/PMI are not transmitted.

The current LTE standard uses the 2-bit CSI request field in DCI format 0 or 4 to provide aperiodic CSI feedback, considering a carrier aggregation (CA) environment. In the CA environment, if multiple serving cells are configured for a UE, the UE interprets a CSI request field as two bits. If one of TMs 1 to 9 is set for all Component Carriers (CCs), aperiodic CSI feedback is triggered according to the values in Table 5 below. And, if TM 10 is set for at least one of the CCs, the aperiodic CSI feedback is triggered according to the values in Table 6 below.

TABLE 5

| CSI Request Field Value | Detailed Description |
|---|---|
| '00' | Aperiodic CSI reporting is not triggered. |
| '01' | Aperiodic CSI reporting for serving cell is triggered. |
| '10' | Aperiodic CSI reporting for serving cells of first set configured by higher layers is triggered. |
| '11' | Aperiodic CSI reporting for serving cells of second set configured by higher layers is triggered. |

TABLE 6

| CSI Request Field Value | Detailed Description |
|---|---|
| '00' | Aperiodic CSI reporting is not triggered. |
| '01' | Aperiodic CSI reporting for CSI process set configured by higher layers for serving cell is triggered. |
| '10' | Aperiodic CSI reporting for CSI process of first set configured by higher layers is triggered. |
| '11' | Aperiodic CSI reporting for CSI process of second set configured by higher layers is triggered. |

1.3. Dual Connectivity

Figure 6:
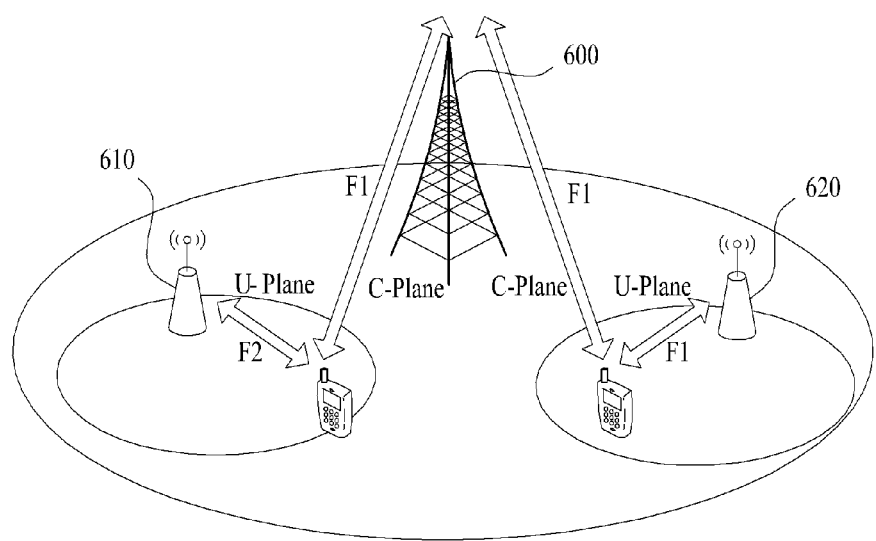
FIG. 6 is a diagram to describe the concept of dual connectivity usable for the present disclosure.

FIG. 6 is a diagram to describe the concept of dual connectivity usable for the present disclosure.

Referring to FIG. 6, carrier aggregation may be performed between a macro cell 610 and small cells 620 and 630. Namely, a macro cell may use n carriers (where n is an arbitrary positive integer) and a small cell may use k carriers (where k is an arbitrary positive integer). Here, carriers of the macro cell and carriers of the small cell may include the same random frequency carriers or the different random frequency carriers. For example, a macro cell may use random frequencies F1 and F2 and a small cell may use random frequencies F2 and F3.

A random User Equipment (UE) located within the small cell coverage may be simultaneously connected to a macro cell and a small cell and receive services from the macro cell and the small cell simultaneously or by Time Division Multiplexing (TDM). Through a macro cell layer, a function (e.g., connection management, mobility, etc.) provided in a control plane (C-plane) can be serviced. In case of a user plane (U-plane) data path, the macro cell, the small cell or the macro cell and the small cell may be selected. For example, in case of real-time data like Voice over LTE (VoLTE), transmission/reception can be performed through the macro cell that secures mobility better than the small cell. In case of a best effort service, a service can be received from the small cell. A connection between the macro cell and the small cell can be established through a backhaul. And, the backhaul may include an ideal backhaul or a nonideal backhaul.

Moreover, in case of the macro cell and the small cell, the same TDD or FDD systems may be configured or TDD and FDD systems may be configured.

The concept of dual connectivity may be observed from FIG. 6. It can be observed that the macro cell and the small cell use the same frequency band or different frequency bands. A random UE having dual connectivity configured therefor can be simultaneously connected to the macro cell and the small cell. FIG. 6 shows a case that a U-plane data path is configured with the small cell.

For clarity, the present disclosure mentions that a random UE configures dual connectivity with a macro cell and a small cell. Yet, the present disclosure is non-limited by cell types such as macro, micro, pico, femto and the like. Moreover, for clarity, it is described that a random dual-connectivity UE configures Carrier Aggregation (CA) by setting a macro cell and a small cell to a Primary cell (Pcell) and a Secondary cell (Scell), respectively. And, the present disclosure is non-limitedly applicable to other configurations.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 7:
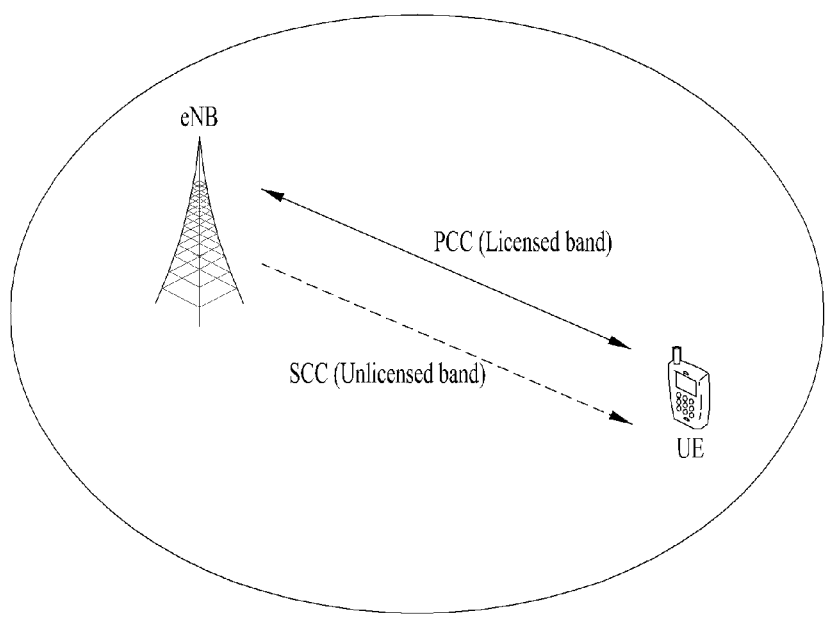
FIG. 7 illustrates an example of a CA environment supported in an LTE-U system.

FIG. 7 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 7, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 7 is only example, and the embodiments of the present disclosure may be applied to even a CA environment that one UE accesses a plurality of eNB s.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 8:
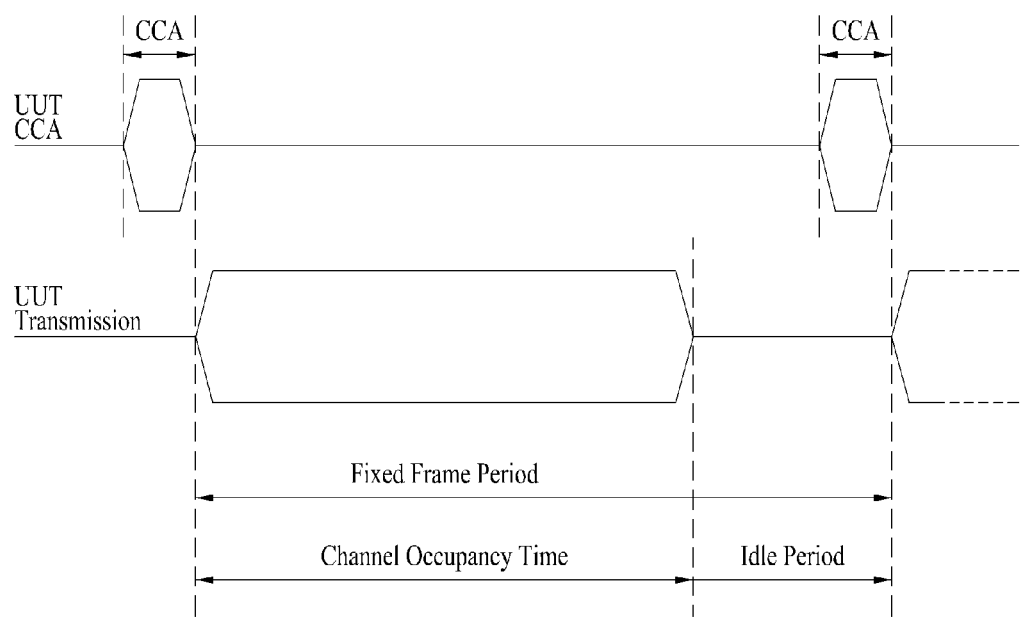
FIG. 8 is a view illustrating an exemplary Frame Based Equipment (FBE) operation as one of LBT operations.

FIG. 8 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 9:
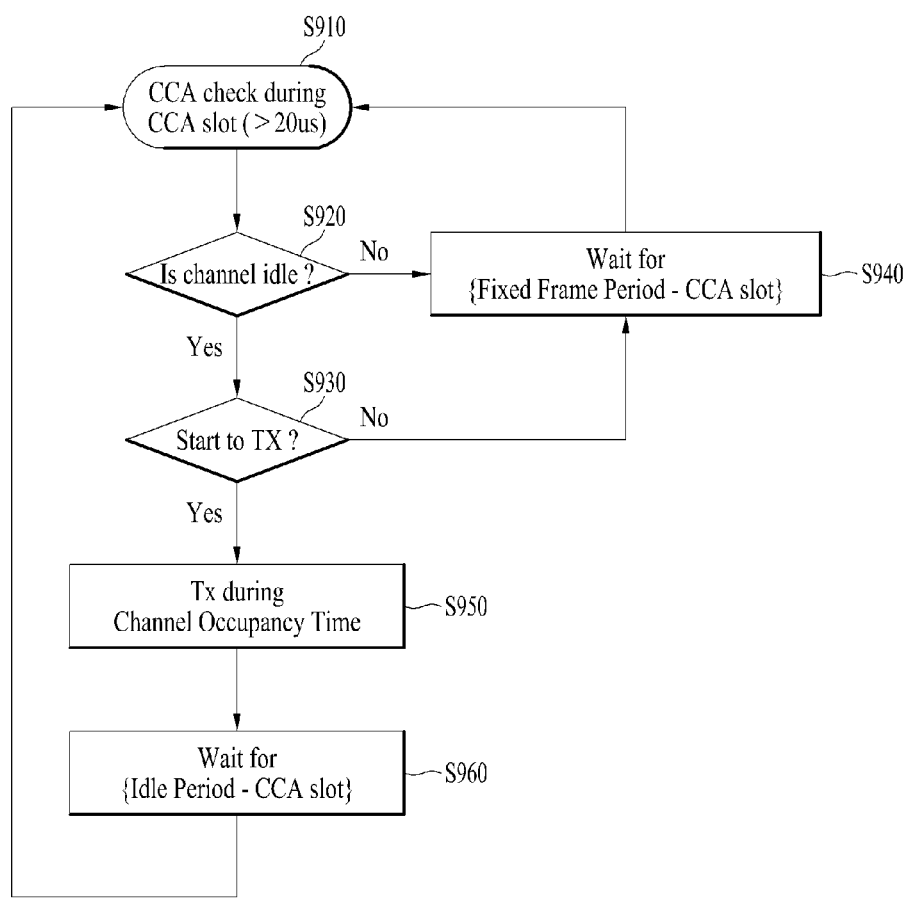
FIG. 9 is a block diagram illustrating the FBE operation.

FIG. 9 is a block diagram illustrating the FBE operation.

Referring to FIG. 9, a communication node (i.e., eNB) managing an SCell performs CCA during a CCA slot [S910]. If the channel is idle [S920], the communication node performs data transmission (Tx) [S930]. If the channel is busy, the communication node waits for a time period calculated by subtracting the CCA slot from a fixed frame period, and then resumes CCA [S940].

The communication node transmits data during the channel occupancy time [S950]. Upon completion of the data transmission, the communication node waits for a time period calculated by subtracting the CCA slot from the idle period [S960], and then resumes CCA [S910]. If the channel is idle but the communication node has no transmission data, the communication node waits for the time period calculated by subtracting the CCA slot from the fixed frame period [S940], and then resumes CCA [S910].

Figure 10:
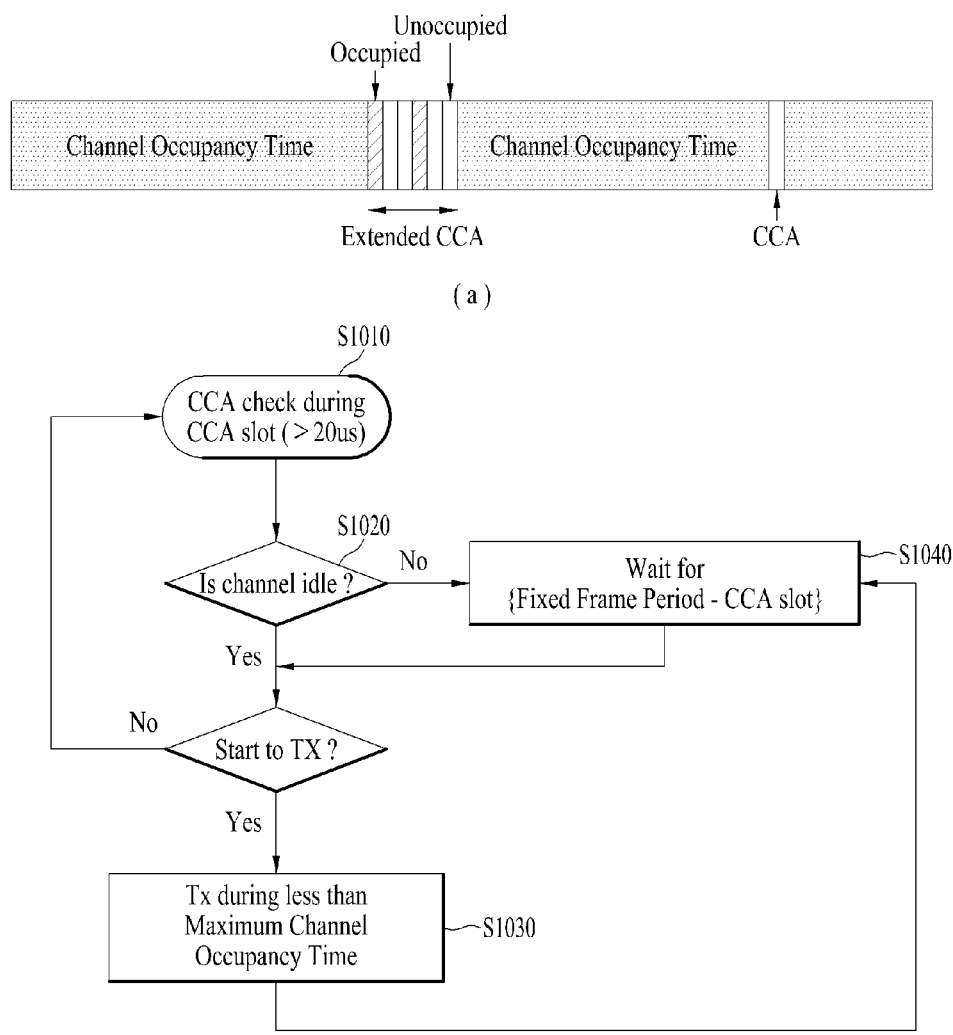
FIG. 10 is a view illustrating an exemplary LBE operation as one of the LBT operations.

FIG. 10 is a view illustrating an exemplary LBE operation as one of the LBT operations.

Referring to FIG. 10(a), in LBE, the communication node first sets q (q∈{4, 5, . . . , 32}) and then performs CCA during one CCA slot.

FIG. 10(b) is a block diagram illustrating the LBE operation. The LBE operation will be described with reference to FIG. 10(b).

The communication node may perform CCA during a CCA slot [S1010]. If the channel is unoccupied in a first CCA slot [S1020], the communication node may transmit data by securing a time period of up to (13/32)q ms [S1030].

On the contrary, if the channel is occupied in the first CCA slot, the communication node selects N (N E {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S1040].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 11:
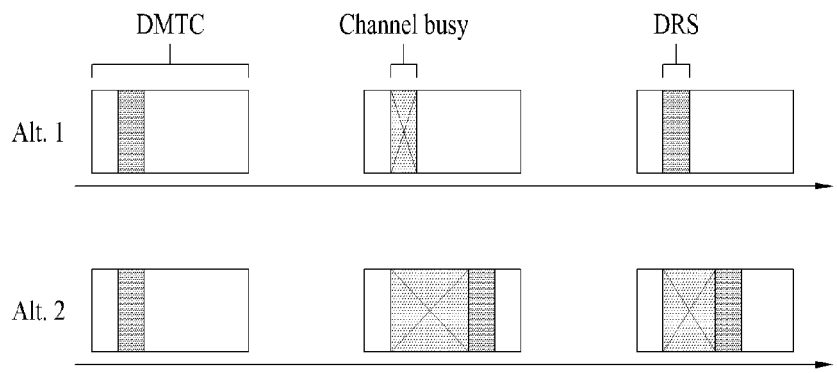
FIG. 11 is a diagram for explaining DRS transmission methods supported by LAA system.

FIG. 11 is a diagram for explaining DRS transmission methods supported by LAA system.

Referring to FIG. 11, the upper part of FIG. 11 shows the aforementioned first scheme for transmitting a DRS and the bottom part of FIG. 11 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 12:
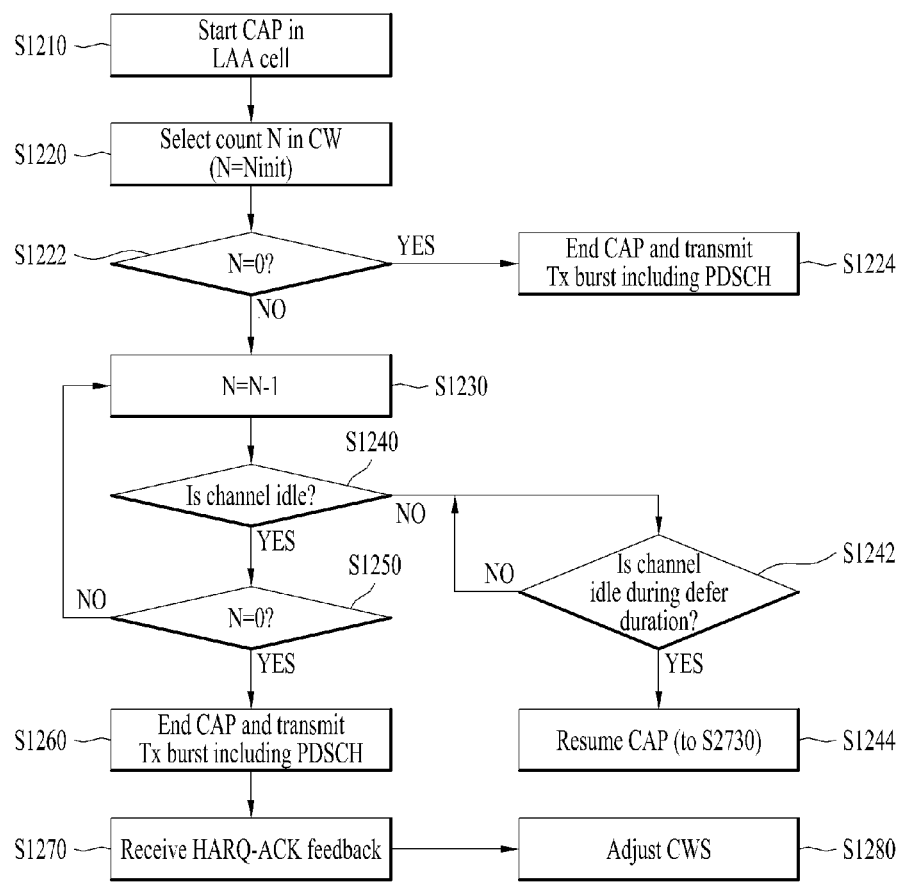
FIG. 12 is a flowchart for explaining CAP and CWA.

FIG. 12 is a flowchart for explaining CAP and CWA.

For DL transmission, an LTE transmission node (e.g., base station) may initiate a channel access procedure (CAP) in order to operate in LAA S cell(s) which are unlicensed band cells (S1210).

The base station can randomly select a back-off counter N from a contention window (CW). In this case, the N is configured by an initial value Ninit [S1220]. The Ninit is randomly selected from among values ranging from 0 to $CW_p$.

Subsequently, if the back-off counter value (N) corresponds to 0 [S1222], the base station terminates the CAP and performs Tx burst transmission including PSCH [S1224]. On the contrary, if the back-off value is not 0, the base station reduces the back-off counter value by 1 [S1230].

The base station checks whether or not a channel of the LAA Scell(s) is in an idle state [S1240]. If the channel is in the idle state, the base station checks whether or not the back-off value corresponds to 0 [S1250]. The base station repeatedly checks whether or not the channel is in the idle state until the back-off value becomes 0 while reducing the back-off counter value by 1.

In the step S1240, if the channel is not in the idle state i.e., if the channel is in a busy state, the base station checks whether or not the channel is in the idle state during a defer duration (more than 15 μsec) longer than a slot duration (e.g., 9 usec) [S1242]. If the channel is in the idle state during the defer duration, the base station can resume the CAP [S1244]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1242 again to check whether or not the channel is in the idle state during a new defer duration.

Referring back to FIG. 12, the base station checks whether or not the back-off counter value (N) becomes 0 [S1250]. If the back-off counter value (N) becomes 0, the base station terminates the CAP and may be able to transmit a Tx burst including PDSCH[S1260].

The base station may receive HARQ-ACK information about a Tx burst from a UE (S1270). The base station may adjust a contention window size (CWS) based on the received HARQ-ACK information (S1280).

In the step S1280, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1260, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 7

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 msms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 7, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 13:
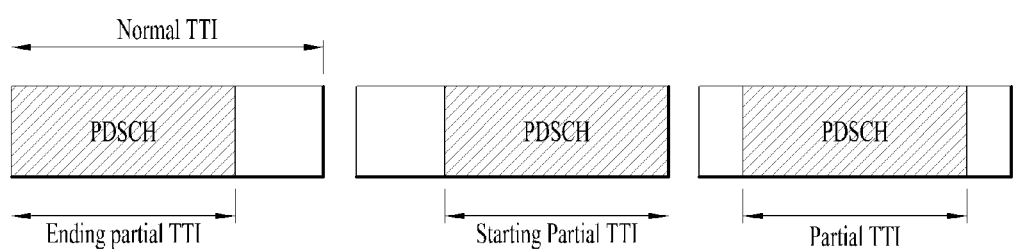
FIG. 13 is a diagram illustrating a partial TTI or a partial subframe applicable to the present disclosure.

FIG. 13 is a diagram illustrating a partial TTI or a partial subframe applicable to the present disclosure.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present disclosure, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 13 illustrates various types of the aforementioned partial TTI. The first drawing of FIG. 13 illustrates an ending partial TTI (or subframe) and the second drawing illustrates a starting partial TTI (or subframe). The third drawing of FIG. 13 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present disclosure is explained on the basis of a DL operation in FIG. 13, the present disclosure can also be identically applied to a UL operation. For example, a partial TTI structure shown in FIG. 13 can be applied to a form of transmitting PUCCH or PUSCH as well.

2.8. Procedure of UE for PUSCH Transmission on LAA SCell

For a serving cell that is an LAA SCell, upon receiving DCI format 0A/0B/4A/4B with PUSCH trigger A' field set to '0' in subframe n through a PDCCH/EPDCCH, a UE may attempt to or perform corresponding PUSCH transmission, by performing a channel access procedure (e.g., LBT), in subframe n+l+k+i (where i=0, 1, . . . N−1). When PUSCH trigger A' field is set to '0', 1 may be set to 4, k may be set to a value indicated by the value of 'Timing Offset' field according to the table shown below, and N may be set to 1 (e.g., for DCI format 0A/4A) or a value indicated by 'number of scheduled subframes' field (e.g., for DCI format 0B/4B).

TABLE 8

| Value of<br>'Timing offset' field | k |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

In addition, for the serving cell that is the LAA SCell, upon receiving DCI format 0A/0B/4A/4B with PUSCH trigger A' field set to '1' in subframe n-p through the PDCCH/EPDCCH and receiving DCI with PUSCH trigger A' field set to '1' in subframe n, the UE may attempt to or perform corresponding PUSCH transmission, by performing the channel access procedure (e.g., LBT), in subframe n+l+k+i (where i=0, 1, . . . N−1). When PUSCH trigger A' field is set to '1', 1 may be set to a value indicated by the value of 'UL duration and offset' field in the DCI with PUSCH trigger B' field set to '1', k and a validation duration v may be set to values indicated by the first two bits and the last 2 bits of 'timing offset' field in the PDCCH/EPDCCH, and N may be set to 1 (e.g., for DCI format 0A/4A) or a value indicated by 'number of scheduled subframes' field (e.g., for DCI format 0B/4B). In this case, p+l+k may be set to at least 4.

TABLE 9

| Value of the first two bits of<br>'Timing offset' field | k |
|---|---|
| 00 | 0 |
| 01 | 1 |
| 10 | 2 |
| 11 | 3 |

TABLE 10

| Value of the last two bits of<br>'Timing offset' field | v |
|---|---|
| 00 | 8 |
| 01 | 12 |
| 10 | 16 |
| 11 | 20 |

Thus, for the serving cell that is the LAA SCell, the UE may not be expected to receive a plurality of UL scheduling grants for one subframe.

3. Proposed Embodiment

The present disclosure proposes a PUSCH transmission method of the UE in the case of 2-stage based UL scheduling of PUSCH trigger A' and PUSCH trigger B', based on the above description. More specifically, the present disclosure proposes a contention window size (CWS) adjustment method, a channel access procedure method (e.g., LBT), an operation of the UE when other UL scheduling coexists, a maximum timing advance (TA) value setting method of the UE according to a UL scheduling timing, and the like, as the PUSCH transmission method caused by 2-stage based UL scheduling.

In consideration of the fact that a minimum of 4 msec is basically required from a reception timing of a UL grant to a transmission timing of a PUSCH in a legacy LTE system, a timing at which a UE actually transmits the PUSCH may be after at least SF #n+4 even though the UE transmits a PUCCH for scheduling PUSCH transmission in SF #n on an LAA SCell after an eNB succeeds in performing LBT even in the LAA system to which the present disclosure is applicable.

In this case, if another node succeeds in performing LBT and then preoccupies (or acquires) a channel first (due to characteristics of an unlicensed band carrier) during a gap of at least 4 ms between a scheduling timing (e.g., SF #n) of the eNB and an actual PUSCH transmission timing (e.g., SF #n+4) of the UE, scheduling transmission itself of the eNB may be meaningless. When an unlicensed band is scheduled through cross-carrier scheduling in a licensed band, a corresponding UL grant may be transmitted regardless of a channel situation of the LAA SCell and then it may be difficult to guarantee the success of LBT of the UE for actual PUSCH transmission.

To overcome this problem, 2-stage UL scheduling described above may be considered.

Figure 14:
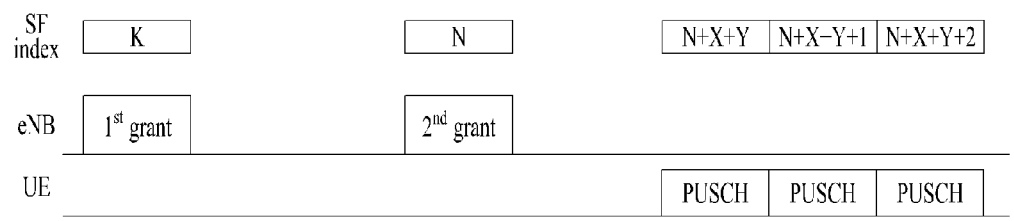
FIG. 14 is a diagram schematically illustrating 2-stage UL scheduling applicable to the present disclosure.

FIG. 14 is a diagram schematically illustrating 2-stage UL scheduling applicable to the present disclosure.

As illustrated in FIG. 14, the eNB transmits a first-stage UL grant (e.g., a first grant) for an LAA SCell in SF #K to the UE and a second-stage UL grant (e.g., a second grant) in SF #N (where N>K) to the UE to trigger actual PUSCH transmission. Upon receiving the first-stage UL grant, the UE preconfigures a PUSCH to be transmitted. Then, if PUSCH transmission is triggered through the second-stage UL grant, the UE may attempt to perform actual PUSCH transmission within a shorter time than 4 msec (after the second-stage UL grant is received).

In this case, the first-stage UL grant is transmitted through first-layer signaling (L1 signaling) or configured through higher-layer signaling. In addition, the first-stage UL grant may be transmitted on the LAA SCell or a licensed band.

Next, for efficient transmission, the second-stage UL grant may be cell-commonly (or group-commonly) transmitted so that all UEs in a cell may receive the second-stage UL grant. As an example, the second-stage UL grant may be transmitted by a common PDCCH (C-PDCCH) which is cyclic redundancy check (CRC)-scrambled by a CC-radio network temporary identifier (RNTI) on the LAA SCell or may be transmitted through a common search space on the licensed band. In SF #N+X+Y, which is a starting time of PUSCH transmission, triggered in SF #N of FIG. 14, the value of X may be signaled by the first-stage UL grant (hereinafter, referred to as UL_g1, for convenience of description) and the value of Y may be signaled by the second-stage UL grant (hereinafter, referred to as UL_g2, for convenience of description).

Hereinafter, a PUSCH transmission method in the case of 2-stage based UL scheduling will be described in detail.

3.1. CWS Adjustment Method

The UE may perform a channel access procedure (e.g., random backoff based category 4 LBT) in order to transmit a PUSCH triggered by a UL grant on the LAA SCell. In this case, the UE needs to determine which CWS is based to perform category 4 LBT.

As an example, the UE may update a CWS based on a new data indicator (NDI) value. Specifically, the UE may initialize CWS values corresponding to all priority classes when a NDI value corresponding to a HARQ process index of a specific reference subframe (SF) is toggled. Alternatively, if the NDI value is not toggled, the UE may increase the CWSs corresponding to all priority classes. In this case, the specific reference SF may be an SF in which first PUSCH transmission is performed among UL burst transmissions and may be defined as an SF in which transmission is performed before k ms (e.g., k=4) from a reception timing of the UL grant.

Similarly, after updating a CWS based on an NDI value included in UL_g1, the UE may perform random backoff based category 4 LBT for PUSCH transmission triggered by UL_g2, based on the updated CWS value.

Notably, PUSCH transmission triggered by UL_g2 may be cell-commonly (or group-commonly) performed and the NDI value may not be UE-specifically signaled. Therefore, the UE may increase the CWS values corresponding to all priority classes upon performing random backoff based category 4 LBT for PUSCH transmission triggered by UL_g2.

Alternatively, the UE may be configured to initialize or maintain the CWS values corresponding to all priority classes in consideration of the situation in which UL_g2 is cell-commonly (or group-commonly) signaled so that the NDI value cannot be UE-specifically signaled (i.e., the eNB cannot provide information regarding CWS adjustment).

The CWS adjustment method according to the present disclosure may be differently determined depending on whether a PUSCH is transmitted between UL_g1 (e.g., SF #K) and UL_g2 (e.g., SF #N). In this case, the PUSCH between UL_g1 (e.g., SF #K) and UL_g2 (e.g., SF #N) may be scheduled by UL_g1 or by a normal UL grant, rather than UL_g1. In addition, the PUSCH between UL_g1 (e.g., SF #K) and UL_g2 (e.g., SF #N) may be a PUSCH scheduled as a category 4 LBT based LBT type or may be a PUSCH actually transmitted after category 4 LBT is performed by a certain rule even without an indication of additional category 4 LBT.

As a specific example, when there is no PUSCH transmission between UL_g1 and UL_g2 (e.g., when the UE performs random backoff based category 4 LBT prior to PUSCH transmission triggered by UL_g2), the UE may maintain the CWS values corresponding to all priority classes.

As another specific example, when there is PUSCH transmission between UL_g1 and UL_g2 or there is PUSCH transmission at least prior to k ms (e.g., k=4) before UL_g2 is received (e.g., the UE performs random backoff based category 4 LBT prior to PUSCH transmission triggered by UL_g2), the UE may conservatively regard feedback for a PUSCH as collision although the UE has not received feedback for the PUSCH and may increase the CWS values corresponding to all priority classes.

The CWS adjustment method according to the present disclosure may be differently determined according to whether a UL grant is received between UL_g1 and UL_g2.

As a specific example, if the NDI value is received through a (UL_g1 or normal) UL grant between UL_g1 and UL_g2 and if the NDI value has condition for initializing the CWS, the UE may be configured to use the initialized CWS value upon performing category 4 LBT triggered by UL_g2.

As another specific example, if the NDI value is received through the (UL_g1 or normal) UL grant between UL_g1 and UL_g2 and if the NDI value has condition for increasing the CWS, the UE may be configured to use the increased CWS value upon performing category 4 LBT triggered by UL_g2.

In summary, when the UE performs random backoff based category 4 LBT for PUSCH transmission triggered by UL_g2, if the UE has not transmitted the PUSCH (after performing category 4 LBT) between UL_g1 and UL_g2 or has not received the UL grant between UL_g1 and UL_g2, the UE may maintain the CWS value. In the other cases, if condition for initializing the CWS is not satisfied, the UE may increase CWS values corresponding to all priority classes.

3.2. LBT Type Selection Method

To perform PUSCH transmission triggered by UL_g2, the UE needs to determine whether to perform category 4 based LBT or LBT through a CCA result during a predetermined time duration (e.g., 25 μsec) in order to attempt to perform triggered PUSCH transmission.

As a basic configuration for this purpose, LBT information needed to perform PUSCH transmission triggered by UL_g2 may be signaled to the UE through UL_g1 and the UE may correspondingly perform LBT according to the LBT information.

As a factor to be considered, when channel occupancy secured (or acquired) by the eNB is shared with an associated UE, even if category 4 based LBT is scheduled for the UE, the UE may be permitted to change an LBT type so that the UE may perform LBT through CCA during a predetermined time duration. In this case, the UE may recognize that the UE is included in channel occupancy of the eNB or recognize that the UE shares channel occupancy with the eNB. As a method of providing the above information to the UE, the eNB may indicate information about a duration of channel occupancy to the UE through a C-PDCCH.

If an LBT method of sensing the CCA result during a predetermined time duration is indicated to the UE through UL_g1, the last SF of the PUSCH triggered by UL_g2 should guarantee to be always included in channel occupancy of the eNB.

As an example, in FIG. 14, when channel occupancy of the eNB signaled through the C-PDCCH ends in SF #N+X+Y+1, LBT for sensing the CCA result during a predetermined time duration may not be permitted with respect to the PUSCH triggered in SF #N+X+Y+2. In other words, the UE may need to perform category 4 based LBT, rather than, LBT for sensing the CCA result during a predetermined time duration, in order to transmit the PUSCH triggered in SF #N+X+Y+2. Generally, for simplicity of the operation of the UE, although it may be desirable that up to the last SF of the PUSCH triggered by UL_g2 be always included in channel occupancy of the eNB, the above configuration may also be permitted to guarantee scheduling flexibility of the eNB.

Accordingly, if partial PUSCHs triggered by UL_g2 are not included in channel occupancy of the eNB and LBT for sensing the CCA result during a predetermined time duration is signaled as the LBT type of the PUSCH, the UE may perform one of the following operations.

Opt1) Transmission of all PUSCHs which are not included in channel occupancy of the eNB are dropped.

Opt2) When PUSCHs which are not included in channel occupancy of the eNB include multiple SFs, only transmission for the first SF which is not included channel occupancy of the eNB may be dropped and the UE may attempt to perform transmission for the other SFs according to a channel sensing result during the one SE As a specific example, if the channel sensing result during one SF is idle, the UE may perform transmission and, if the channel sensing result is busy, the UE may attempt to perform transmission after performing category 4 LBT.

Opt 3) Category 4 LBT is performed starting from the first SF triggered through UL_g2

If partial PUSCHs triggered through UL_g2 are not included in channel occupancy of the eNB and category 4 LBT is signaled as the LBT type of the PUSCH, the UE may perform one of the following operations.

The UE performs category 4 LBT according to the received signaling.

The UE attempts to perform transmission for the first SF through an LBT method of sensing a CCA result during a predetermined time duration and performs the operation according to Opt1 or Opt2 with respect to SFs which are not included in channel occupancy of the eNB.

3.3. PUSCH Transmission Method of UE When PUSCH Caused by 2-stage UL Scheduling and PUSCH Caused by Normal UL Grant Coexist 3.3.1. First PUSCH Transmission Method when PUSCH Caused by UL_g2 and PUSCH Caused by Normal UL Grant Coexist In FIG. 14, a PUSCH triggered by UL_g2 and a PUSCH caused by a normal UL grant in may coexist SF #N. In this case, a PUSCH scheduled by 2-stage UL scheduling (e.g., a PUSCH triggered by UL_g2) may be transmitted within a shorter time (e.g., within SF #N+4) than 4 ms from a triggering timing (e.g., SF #N).

For example, in FIG. 14, it is assumed that X=Y=1, the PUSCH is triggered by UL_g2 in SF #N for UE #0, and the PUSCH is triggered by a normal UL grant in SF #N for UE #1. In this case, UE #0 is scheduled to successively transmit the PUSCH in 3 SFs starting from SF #N+2 as illustrated in FIG. 14. In this case, since the transmission timing of UE #0 is faster than the transmission timing of UE #1, UE #1 may fail to perform LBT due to transmission of UE #0 and cannot attempt to perform PUSCH transmission.

Accordingly, in consideration of the above situation, a gap for performing LBT may be configured to be provided only for partial SFs among SFs triggered by UL_g2 in SF #N.

Specifically, when PUSCH transmission is triggered by UL_g2 in SF #N, the UE may not attempt to perform PUSCH transmission during T symbols immediately before (or immediately after) SF #N+K. In this case, K may be preset to a specific value (e.g., 4) or may be configured by higher-layer signaling or first-layer signaling. Likewise, T may be preset to a specific value (e.g., 1) or may be configured by higher-layer signaling or first-layer signaling. If PUSCH transmission is not permitted during one symbol immediately before SF #N+4, the UE may not perform transmission during the last symbol by performing rate-matching or puncturing for a PUSCH transmitted in SF #N+3.

If UE #0 fails to receive UL_g2_1 even though the eNB has transmitted UL_g2_1 to UE #0 that has received UL_g1 and if UE #0 receives UL_g2_2 that the eNB has transmitted to trigger PUSCH transmission of UE #1, then UE #0, as well as UE #1, may attempt to perform PUSCH transmission corresponding to UL_g2_2 unlike the intention of the eNB.

As a method for solving such a mismatch between the UE and the eNB, a valid time window for UL_g1 may be configured (by first-layer signaling or higher-layer signaling, including UL_g1). That is, if the UE that has received UL_g1 fails to receive UL_g2 during the valid time window, the UE may regard UL_g1 as scheduling which is not valid any longer.

While the above description has considered the case in which a normal UL grant and a 2-stage UL scheduling grant coexist for different UEs, the above configuration may be extended to the case in which the normal UL grant and the 2-stage UL scheduling grant coexist for the same UE.

3.3.2. Second PUSCH Transmission Method when PUSCH Caused by UL_g2 and PUSCH Caused by Normal UL Grant Coexist Hereinafter, a PUSCH transmission method of the UE will be described in detail when the UE that has received UL_g1 receives a normal UL grant during a valid time window (or when the UE receives the normal UL grant within a duration including a timing immediately before a transmission starting timing (or including a timing before k ms from the transmission starting timing) of the PUSCH scheduled by UL_g2 as well as the valid time window). The above method may be equally applied to the case in which the UE receives a plurality of normal UL grants during the valid time window.

Specifically, when the last SF of the valid time window is SF #n and a transmission timing of the PUSCH scheduled by UL_g2 transmitted at a timing of SF #n is SF #n+X+Y, the above method includes a PUSCH transmission method when the UE receives a normal UL grant within the valid time window (additionally, up to SF #n+X+Y or SF #n+X+Y-k) duration. Herein, k may be greater than 1 and may be preset or configured through first-layer signaling or higher-layer signaling. In addition, during k ms immediately before a transmission starting timing of the PUSCH scheduled by UL_g2, the UE may not expect that the normal UL grant will be received due to lack of a processing time or the UE may regard the normal UL grant received within a corresponding duration as scheduling which is always invalid.

3.3.3. Third PUSCH Transmission Method when PUSCH Caused by UL_g2 and PUSCH Caused by Normal UL Grant Coexist When the UE that has received UL_g1 receives a normal UL grant during a valid time window (and/or immediately before a transmission starting timing of a PUSCH scheduled by UL_g2 or before k ms from the corresponding timing), the UE may regard UL_g1 as scheduling which is not valid any longer even if a timing at which the normal UL grant is received is within the valid time window for UL_g1.

Alternatively, when the UE that has received UL_g1 receives the normal UL grant during the valid time window (and/or immediately before a transmission starting timing of the PUSCH scheduled by UL_g2 or before k ms from the corresponding timing) and a reception timing of the normal UL grant is earlier than or equal to UL_g2 within the valid time window for UL_g1, the UE may regard UL_g1 (and UL_g2) as scheduling which is not valid any longer.

Then, if validity of UL_g1 (and UL_g2) is acknowledged according to the above method, the UE performs PUSCH transmission according to 2-stage UL scheduling and if validity of UL_g1 (and UL_g2) is not acknowledged according to the above method, the UE performs PUSCH transmission according to the normal UL grant.

3.3.4. Fourth PUSCH Transmission Method when PUSCH Caused by UL_g2 and PUSCH Caused by Normal UL Grant Coexist The UE that has received UL_g1 may be permitted to receive the normal UL grant for scheduling flexibility of the eNB during a valid time window (and/or immediately before a transmission starting timing of a PUSCH scheduled by UL_g2 or before k ms from the corresponding timing). In this case, different operations of the UE may be defined according to a HARQ process index scheduled by the normal UL grant and a HARQ process index scheduled by UL_g1.

For a more detailed description, a method of determining whether UL_g1 is valid according to the above example will be described first and a PUSCH transmission method of the UE when both the normal UL grant and UL_g1 are valid will be described next.

3.3.4.1. Method of Determining Validity of UL_g1

3.3.4.1.1. First Validity Determination Method

If HARQ process index(es) scheduled by a normal UL grant do not overlap with HARQ process index(es) scheduled by UL_g1, the UE may regard both UL_g1 and the normal UL grant are as scheduling which is valid. In an LTE Rel-14 eLAA system to which the present disclosure is applicable, upon considering that multi-subframe scheduling for UL transmission may be performed, the number of HARQ process indexes corresponding to the normal UL grant and UL_g1 may be plural.

3.3.4.1.2. Second Validity Determination Method

If HARQ process index(es) scheduled by the normal UL grant overlap with HARQ process index(es) scheduled by UL_g1, the UE may regard UL scheduling corresponding to UL_g (or the normal UL grant) for the overlapping HARQ process index(es) as scheduling which is invalid and regard UL scheduling for all non-overlapping HARQ process index(es) as scheduling which is valid.

For example, from the viewpoint of a specific UE, if HARQ processes #1, #2, and #3 are scheduled by UL_g1 and HARQ processes #3, #4, and #5 are scheduled by the normal UL grant, since an overlapping HARQ process index is HARQ process #3, the UE may regard only UL_g1 corresponding to HARQ process indexes #1 and #2 and the normal UL grant corresponding to HARQ process indexes #3, #4, and #5 are being valid. Then, only UL transmission corresponding to HARQ process indexes #1 and #2 is triggered for the UE that has received UL_g2 (within the valid time window) to perform PUSCH transmission.

3.3.4.1.3. Third Validity Determination Method

If HARQ process index(es) scheduled by a normal UL grant overlap with HARQ process index(es) scheduled by UL_g1, the UE may regard all UL scheduling corresponding to UL_g1 (or the normal UL grant) as scheduling which is invalid. For example, from the viewpoint of a specific UE, if HARQ processes #1, #2, and #3 are scheduled by UL_g1 and HARQ processes #3, #4, and #5 are scheduled by the normal UL grant, since there is an overlapping HARQ process index, the UE may regard only the normal UL grant as scheduling which is valid. Then, the UE may not perform corresponding UL transmission even if the UE receives UL_g2 (within the valid time window).

Hereinafter, a PUSCH transmission method of the UE will be described in more detail when a valid UL grant is determined by the above-described validity determination method and other methods and when a transmission timing of a PUSCH triggered by UL_g2 overlaps with a transmission timing of a PUSCH transmitted at a timing designated by the normal UL grant.

3.3.4.2. PUSCH Transmission Method 3.3.4.2.1. First PUSCH Transmission Method

If a transmission timing of a PUSCH triggered by UL_g2 overlaps with a transmission timing of a PUSCH designated by a normal UL grant, the UE may prioritize the PUSCH caused by UL_g2. As an example, when the PUSCH triggered by UL_g2 is scheduled to be transmitted in SF #1 and SF #2 and the PUSCH corresponding to the normal UL grant is scheduled to be transmitted in SF #2 and SF #3, the UE may transmit the PUSCH triggered by UL_g2 in SF #1 and SF #2 and transmit the PUSCH scheduled by the normal UL grant in SF #3.

3.3.4.2.2. Second PUSCH Transmission Method

Upon considering that UL_g2 is UE-common (or UE group-common) and the normal UL grant is UE-specific, it is desirable that the UE prioritize the normal UL grant. In other words, if a transmission timing of the PUSCH triggered by UL_g2 and a transmission timing of the PUSCH scheduled by the normal UL grant overlap, the UE may prioritize PUSCH transmission caused by the normal UL grant.

As an example, when the PUSCH triggered by UL_g2 is scheduled to be transmitted in SF #1 and SF #2 and the PUSCH scheduled by the normal UL grant is scheduled to be transmitted in SF #2 and SF #3, the UE may transmit the PUSCH triggered by UL_g2 in SF #1 and transmit the PUSCH scheduled by the normal UL grant in SF #2 and SF #3.

3.3.4.2.3. Third PUSCH Transmission Method

The above-described first PUSCH transmission method and second PUSCH transmission method have basically not considered the case in which there are multiple transport blocks corresponding to multiple HARQ process indexes in the same SF. If transmission of multiple transport blocks is permitted, the PUSCH transmission operations may be configured as follows.

Specifically, when transmission of multiple transport blocks is permitted and when a transmission timing of the PUSCH triggered by UL_g2 and a transmission timing of the PUSCH scheduled by the normal UL grant overlap, the UE may transmit all transport blocks if frequency resources in an overlapping SF do not overlap and transmit the PUSCH according to the first PUSCH transmission or the second PUSCH transmission method if the frequency resources overlap.

As an example, if the PUSCH triggered by UL_g2 is scheduled to be transmitted in interlace #0 of SF #1 and SF #2 and the PUSCH scheduled by the normal UL grant is scheduled to be transmitted in interlace #1 of SF #2 and SF #3, since frequency resources do not overlap in SF #2, the UE may transmit the PUSCH triggered by UL_g2 in SF #1 and SF #2 and transmit the PUSCH scheduled by the normal UL grant in SF #2 and SF #3. Herein, interlace may be defined as a set of RBs which are evenly distributed in consideration of an occupied bandwidth of an unlicensed band and power spectral density regulation. For example, in a 100-RB system, one interlace includes 10 RBs each being separated in units of 10 RBs.

3.3.5. Fifth PUSCH Transmission Method when PUSCH Caused by UL_g2 and PUSCH Caused by Normal UL Grant Coexist In PUSCH #1 scheduled by UL_g1 and UL_g2 and PUSCH #2 scheduled through the normal UL grant, even when UL_g1 precedes the normal UL grant, PUSCH #1 actually scheduled by UL_g1 (and UL_g2) may be scheduled later than PUSCH #2. Alternatively, actual transmission timings of PUSCHs scheduled by a plurality of normal UL grants may differ in time order from reception timings of the normal UL grants.

As an example, normal grant #A received in SF #n may schedule a PUSCH in SF #n+6 and normal grant #B received in SF #n+1 may schedule a PUSCH in SF #n+5, because scheduling delay information is explicitly indicated through a UL grant for LAA UL transmission.

In this way, a reception order of UL grants may not be equal in time to a transmission order of PUSCHs corresponding to the respective UL grants. This may affect implementation of a medium access control (MAC) layer of the UE, implementation of a Tx buffer, or design of a Tx memory.

Upon considering an effect of UE implementation, when a reception order of UL grants may not be equal in time to a transmission order of PUSCHs scheduled by the respective UL grants, whether transmission of the PUSCHs is supported may be defined by capability of the UE or information about whether transmission of the PUSCHs is supported may be signaled or configured by a network.

In the present disclosure, when a reception order of UL grants actually received by a specific UE may not be equal in time to a transmission order of PUSCHs scheduled by the respective UL grants, PUSCH handling or PUSCH transmission may not be supported for the specific UE. In this case, the present disclosure proposes the following UE operations.

3.3.5.1. First UE Operation Example

The UE may perform PUSCH transmission scheduled by each UL grant according to time order in which UL grants are received, wherein the UE may not perform PUSCH transmission corresponding to a UL grant for scheduling PUSCH transmission at an earlier timing than a previously received UL grant. Alternatively, the UE may perform PUSCH transmission according to a PUSCH transmission order corresponding to a received UL grant and may not perform PUSCH transmission corresponding to a UL grant for scheduling PUSCH transmission at a later timing than a subsequently received UL grant. In this case, the above operation of the UE may be configured by an additional rule or setting.

Basically, when a reception order of UL grants in time is not equal to a transmission order of PUSCHs scheduled by respective UL grants in time, if whether to support transmission of the PUSCHs is signaled, it is desirable that the network guarantee PUSCH scheduling which is not changed in time for the UE. However, UL transmission which does not greatly affect the operation of a MAC layer of the UE (e.g., aperiodic CSI only transmission without a UL-SCH or a sounding reference signal (SRS)) may be permitted (even though the fact that PUSCH handling or PUSCH transmission is not supported is signaled when a reception order of UL grants in time is not equal to a transmission order of PUSCHs scheduled by respective UL grants in time).

3.3.5.2. Second UE Operation Example

When a reception order of UL grants which are actually received by the UE is not equal in time to a transmission order of PUSCHs scheduled by respective UL grants, the fact that PUSCH handling or PUSCH transmission is not supported may be signaled to the UE. In this case, the UE may perform only PUSCH transmission caused by a UL grant for scheduling UL transmission including a UL-SCH.

In the above case, whether a PUSCH transmission operation of the UE is applied only to UL transmission including the UL-SCH or is to commonly applied to all UL transmissions may be defined by UE capability or whether to support the above operation may be signaled by the network.

As an example, normal UL grant #A or UL_g1 #A, transmitted in SF #n, may schedule PUSCH #1 in SF #n+6 and normal UL grant #B or UL_g1 #B, transmitted in SF #n+1, may schedule PUSCH #2 in SF #n+5. In this case, if an SRS is included in PUSCH #2, the UE may drop UL-SCH transmission and perform SRS transmission (or LBT for SRS transmission). Alternatively, such an operation may be permitted.

Additionally, if aperiodic CSI only transmission without the UL-SCH is triggered on PUSCH #2, the UE may perform corresponding PUSCH transmission (or LBT for corresponding PUSCH transmission). Alternatively, such an operation may be permitted.

Such an operation configuration may be equally applied even to multi-SF scheduling, as well as a single-SF scheduling.

3.4. PUSCH Transmission Method of UE when a Plurality of UL_g1s Coexists

An issue when a 2-stage UL grant and a normal UL grant coexist has been considered in Section 3.3. In this section, the operation of the UE when the UE that has received UL_g1 newly receives UL_g1 during a valid time window will now be described in detail.

3.4.1. First PUSCH Transmission Method when a Plurality of UL_g1s Coexists

The methods according to Subclauses 3.3.3. and 3.3.4. of Section 3.3. may be extended to a UE operation when a plurality of UL_g1s coexists for a specific UE. Notably, when multiple UL_g1s are valid, an actual PUSCH transmission timing according to the first to third PUSCH transmission methods of Subclauses 3.3.4.2.1. to 3.3.4.2.3. described above may be commonly triggered by one UL_g2 or the value of Y for determining the actual PUSCH transmission timing may be commonly applied to UL_g2.

3.4.2. Second PUSCH Transmission Method when a Plurality of UL_g1s Coexists

In UE operation implementation, as a method for avoiding confusion, the UE may be configured not to expect that the UE will receive new UL_g1 during the valid time window. In this case, UL_g2 for triggering UL_g1 may be transmitted in multiple SFs. As an example, UL_g2 having a bit field set to 'on', the bit field triggering UL_g1 within the valid time window, may be transmitted in multiple SFs. Then, a decoding probability of the UE that receives UL_g2 may be raised.

If UL_g2s are transmitted in SF #n and SF #n+1 and PUSCH transmission starting timings indicated by the respective UL_g2s differ, the UE may not accurately determine an actual PUSCH transmission timing. In other words, a determination result of the actual PUSCH transmission timing of the UE caused by a plurality of UL_g2s may cause ambiguity.

As a method of preventing this problem, if Y=y is indicated by UL_g2_1 transmitted in SF #n, the value of Y indicated by UL_g2_2 transmitted in SF #n+k may be limited to be set to Y=y-k. In this way, signaling limitation may be applied so that actual PUSCH transmission timings indicated by different UL_g2s may be equal. In addition, signaling limitation may be applied so that duration values of UL bursts indicated by respective UL_g2s transmitted in SF #n and SF #n+k may be equal.

3.5. PRACH and/or SRS Transmission Method

Even if a PUSCH is triggered by UL_g2, a time of at least 1 ms or more may be additionally needed in order for the UE to transmit the triggered PUSCH in consideration of a demodulation reference signal (DM-RS) sequence, a data scrambling method, and power distribution with other carriers which differ according to an SF index. Meanwhile, since a sequence for PRACH transmission does not vary with the SF index, the UE may attempt to perform PRACH transmission within an earlier time from a triggering timing caused by UL_g2 than PUSCH transmission described above.

In consideration of the above situation, if PRACH transmission is triggered by UL_g2 transmitted in SF #N, the UE may be configured to transmit a PRACH through specific symbols of SF #N or specific symbols of SF #N+1. In this case, UEs configured to transmit the PRACH by UL_g2 may be preconfigured through first-layer signaling or higher-layer signaling. Information about which physical resources will be used and which sequences for PRACH transmission will be used by the UEs may be preconfigured through first-layer signaling or higher-layer signaling. The above method may be equally applied even to SRS (or PUCCH) transmission as well as PRACH transmission.

3.6. Information Indicated by UL_g1 and UL_g2 for PUSCH Transmission and Interpretation Method of UE Therefor In the LTE Rel-14 eLAA system to which the present disclosure is applicable, UL_g1 may mean a UL grant having PUSCH trigger A' field set to '1' among UL grants for an LAA SCell. In addition, in the LTE Rel-14 eLAA system, UL_g2 may mean a UL grant having PUSCH trigger B' field set to '1', transmitted by a C-PDCCH CRC-scrambled by a CC-RNTI, among UL grants for the LAA SCell.

In addition, the eNB may indicate a configuration for UL SFs through a C-PDCCH for the LAA SCell transmitted in SF #N. In this case, detailed configuration information may include information about a starting point of a duration in which UL SFs are started and information about the duration of the UL SFs.

For example, if the starting point of UL SFs in the C-PDCCH transmitted in SF #N is indicated as 1 and the duration is indicated as d, the UE may recognize SFs from SF #N+1 to SF #N+1+d−1 as UL SFs and may not expect that DL reception will be performed in the corresponding UL SFs. In this case, the value of 1 may be indicated by a 'UL offset' field of Table 11 and the value of k may be indicated by a 'UL duration' field of Table 11.

TABLE 11

| Value of 'UL configuration for LAA' field | UL offset, $l$ (in subframes) | UL duration, $d$ (in subframes) |
|---|---|---|
| 00000 | Not configured | Not configured |
| 00001 | 1 | 1 |
| 00010 | 1 | 2 |

TABLE 11-continued

| Value of 'UL configuration for LAA' field | UL offset, $l$ (in subframes) | UL duration, $d$ (in subframes) |
|---|---|---|
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

In PUSCH transmission which is started after SF #N+1 and is ended within SF #N+1+d−1 without any gap, the UE that transmits a corresponding PUSCH may be configured to perform category 2 LBT regardless of an LBT type preconfigured as an LBT for the PUSCH (e.g., random backoff based category 4 LBT, or category 2 LBT for determining transmission after performing CCA during a predetermined time).

Meanwhile, in order for the UE to perform category 2 LBT, the eNB should guarantee that a UL SF duration is included in channel occupancy of the eNB obtained by performing category 4 LBT.

However, according to Table 11, if a UL offset value is set, a UL duration value is always set to one or more SFs. Accordingly, as described above, if the eNB triggers a single SF through a 2-stage UL grant as a method for guaranteeing that a scheduled UL SF is included in channel occupancy of the eNB, constrains may always be imposed on triggering in that the single SF should belong to channel occupancy of the eNB. More generally, the eNB may require permission of an operation of triggering PUSCH scheduling by a 2-stage grant even in a duration other than channel occupancy of the eNB.

To solve this problem, a method of indicating only the UL offset value without the UL duration through a UL grant with PUSCH trigger B' field set to '1' may be required. The above method may be needed when the eNB using Type B multi-carrier LBT does not intend to change of the LBT type of the UE to category 2 LBT even when a carrier in which category 2 LBT is performed is included in channel occupancy of the eNB.

Herein, Type B multi-carrier LBT may means an LBT operation in which the eNB performs category 4 LBT only for one carrier (e.g., CC1) among a plurality of carriers and performs category 2 LBT for the other carriers (e.g., CC2). In this case, during channel occupancy of the eNB configured for CC1, the UE may change the LBT type to category 2 LBT during UL transmission on CC1 but cannot change the LBT type to category 2 LBT during UL transmission on CC2. In this case, the eNB will not inform the UE of a carrier on which category 4 LBT has been performed. The eNB may not represent channel occupancy of the eNB by not informing the UE of a UL duration on a C-PDCCH.

3.6.1. First Interpretation Method of UE for Information Indicated by UL_g1 and UL_g2 for PUSCH Transmission In a UL grant with PUSCH trigger B' field set to '1', if the value of 'UL configuration for LAA' field of the UL grant is '00000' and/or '11111' (e.g., 'not configured' and/or 'reserved' state in Table 11), the UE may be configured to recognize a corresponding UL grant as 2-stage grant triggering indicating only the UL offset value without the UL duration.

In this case, the UL offset value may be separately predetermined with respect to each UE or may be configured by higher-layer signaling or first-layer signaling. Alternatively, if the fastest transmittable PUSCH timing starting from a reception timing of the UL grant with PUSCH trigger B' field set to '1' is configured by capability of the UE and the timing value is defined as k_cap (where k_cap=1,2,3,4), the UL offset value may be set to k_cap. Alternatively, the UL offset value may be set to as k_cap+additional offset value. In this case, the additional offset value may be preset or may be configured through higher-layer signaling of first-layer signaling.

3.6.2. Second Interpretation Method of UE for Information Indicated by UL_g1 and UL_g2 for PUSCH Transmission According to Table 11, a UL duration value, which is one of 1 to 6, matches each UL offset value. In this case, partial state(s) among corresponding states may be configured such that only the UL offset is valid without a corresponding UL duration value.

For example, states in which the UL duration value of Table 11 is '1' may be configured to be changed to a state in which only the UL offset value is valid without the UL duration value. This is because, when a single SF is indicated as a UL SF, this may not have a significant effect on battery saving of the UE is not affected even when the UE does not perform DL reception in the corresponding SF and change of the LBT type for the single SF to category 2 LBT by the UE may have no big gain. According to the above example, Table 11 may be changed to Table 12.

TABLE 12

| Value of 'UL configuration for LAA' field | UL offset, $^l$ (in subframes) | UL duration, $^d$ (in subframes) |
| --- | --- | --- |
| 00000 | Not configured | Not configured |
| 00001 | 1 | x |
| 00010 | 1 | 2 |
| 00011 | 1 | 3 |
| 00100 | 1 | 4 |
| 00101 | 1 | 5 |
| 00110 | 1 | 6 |
| 00111 | 2 | x |
| 01000 | 2 | 2 |
| 01001 | 2 | 3 |
| 01010 | 2 | 4 |
| 01011 | 2 | 5 |
| 01100 | 2 | 6 |
| 01101 | 3 | x |
| 01110 | 3 | 2 |
| 01111 | 3 | 3 |
| 10000 | 3 | 4 |
| 10001 | 3 | 5 |
| 10010 | 3 | 6 |
| 10011 | 4 | x |
| 10100 | 4 | 2 |

TABLE 12-continued

| Value of 'UL configuration for LAA' field | UL offset, $^l$ (in subframes) | UL duration, $^d$ (in subframes) |
| --- | --- | --- |
| 10101 | 4 | 3 |
| 10110 | 4 | 4 |
| 10111 | 4 | 5 |
| 11000 | 4 | 6 |
| 11001 | 6 | x |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

As a specific example, a specific UE may receive, in SF #N, a C-PDCCH with 'UL configuration for LAA' field indicated as '00111' and PUSCH trigger B' field set to '1'. In this case, if the specific UE receives a scheduling delay value set to '1' through UL_g1, the specific UE may perform LBT for PUSCH transmission scheduled from SF #N+2+1. The LBT type for PUSCH transmission may confirm to an LBT type indicated by UL_g1.

3.7. Maximum Timing Advance (TA) Value Setting Method of UE

In a legacy LTE system, the maximum value of TA is set to 20512 $T_s$ (about 667 μsec and 20512+624*$T_s$ in the case of time division duplex (TDD), wherein $T_s$=1/2048/15 k sec). In a dual connectivity situation of the legacy LTE system, the maximum value of TA for a secondary cell group (SCG) may be set to 4096 $T_s$ (about 133 μsec and 4096+624*$T_s$ in the case of TDD).

In the LAA system to which the present disclosure is applicable, the fastest transmittable PUSCH timing starting from a reception timing of a UL grant (e.g., UL_g2) with PUSCH trigger B' field set to '1' is configured by capability of the UE and the timing value is defined as k_cap (where k_cap=1,2,3). In this case, the maximum TA value for a specific k_cap may be separately defined.

Figure 15:
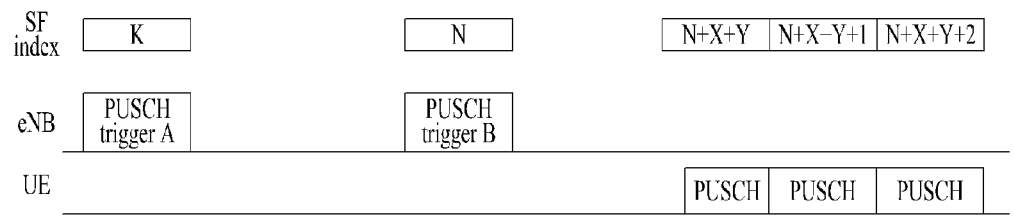
FIG. 15 is a diagram schematically illustrating 2-stage UL scheduling applicable to the present disclosure.

FIG. 15 is a diagram schematically illustrating 2-stage UL scheduling applicable to the present disclosure.

As illustrated in FIG. 15, a specific UE may receive a UL grant with PUSCH trigger A' field set to '1' (hereinafter, referred to as UL_g1 for convenience of description) in SF #K and receive a UL grant with PUSCH trigger B' field set to '1' (hereinafter, referred to as UL_g2 for convenience of description) in SF #N. In information indicating SF #N+X+Y which is a starting timing of PUSCH transmission triggered by the UL grant transmitted in SF #N, the value of X may be signaled by UL_g1 and the value of Y may be signaled by UL_g2.

When X+Y is equal to 1, the UE needs to decode a C-PDCCH (e.g., UL_g2) received in SF #N and transmit a PUSCH in SF #N+1. However, the UE having a TA value of 667 μsec may make it difficult to implement this operation.

Therefore, the present disclosure proposes that an additional maximum value for the UE be set when the value of X+Y is less than a specific value (e.g., 4).

3.7.1. First Maximum TA Value Setting Method

Different maximum TA values may be set for the UE according to the value of X+Y. If a TA larger than a maximum TA for a specific value of X+Y is set for the UE, the UE may drop PUSCH transmission in SF #N+X+Y or drop only PUSCH transmission for partial symbols of a corresponding PUSCH.

3.7.2. Second Maximum TA Value Setting Method

Different maximum TA values may be applied to the UE according to a PUSCH starting position of SF #N+X+Y.

In the LTE Rel-14 eLAA system to which the present disclosure is applicable, the PUSCH starting position may be indicated as one of (1) symbol #0 boundary, (2) symbol #0 boundary+25 μsec, (3) symbol #0 boundary+25 μsec+TA, and (4) symbol #1 boundary.

When the value of X+Y is 1, it is assumed that a maximum TA value is defined as $TA_1*T_s$. In this case, if the PUSCH transmission starting position in SF #N+X+Y is indicated as a symbol #1 boundary, the maximum TA value may be set to $(TA_1+T_{offset})*T_s$ (where $T_{offset}$ may be equal to one symbol duration). If the TA value configured for the UE is greater than $(TA_1+T_{offset})*T_s$, the UE may be configured to drop PUSCH transmission in SF #N+X+Y (or drop transmission for some symbols of a corresponding PUSCH).

Additionally, if a starting position is defined in addition to the PUSCH starting position defined in the LTE Rel-14 eLAA system to which the present disclosure is applicable, the same rule may be applied to the newly defined PUSCH transmission starting position (e.g., second slot boundary).

As a specific example, when X+Y is equal to 1 as described in the above example, it is assumed that the maximum TA value is defined as $TA_1*T_s$. In this case, if the PUSCH transmission starting position on SF #N+X+Y is indicated as the second slot boundary, the maximum TA value may be $(TA_1+T_{offset2})*T_s$ (where $T_{offset2}$ value may be equal to one slot duration). If the TA value configured for the UE is greater than $(TA_1+T_{offset2})*T_s$, the UE may be configured to drop PUSCH transmission in SF #N+X+Y (or drop transmission for some symbols of the PUSCH).

3.7.3. Third Maximum TA Value Setting Method

Different maximum TA values may be applied according to the number of symbols of a PDCCH on which UL_g2 is transmitted in SF #N. Specifically, the number of symbols of the PDCCH on which UL_g2 of SF #N is transmitted may be determined by a PCFICH of the corresponding SF and a large maximum TA value may be set as a time region signaled in a PCFICH decreases. The above configuration considers that the decoding time of a C-PDCCH on which UL_g2 is carried may be reduced as the number of symbols of the PDCCH decreases.

3.7.4. Fourth Maximum TA Value Setting Method

According to various methods described earlier, when the maximum TA value is set (e.g., the maximum TA value is set according to the value of X+Y as in the first maximum TA value setting method, a different maximum TA value is set according to a PUSCH transmission starting position as in the second maximum TA value setting method, or a different maximum TA value is set according to the number of symbols of the PDCCH in which UL_g2 is transmitted as in the third maximum TA value setting method), SRS transmission in a corresponding SF may be permitted even if specific PUSCH transmission is dropped (without attempting to perform LBT) due to the maximum TA value.

For example, when X+Y is equal to 1 as described above, it is assumed that the maximum TA value is defined as $TA_1*T_s$. In this case, if the TA value configured for the UE is greater than $TA_1*T_s$, the UE may drop PUSCH transmission in scheduled SF #N+X+Y. However, when an SRS is scheduled within the PUSCH SF, the UE may attempt to perform LBT for SRS transmission and may perform the SRS upon succeeding in performing LBT.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the eNB informs the UE of information as to whether the proposed methods are applied (or information about rules of the proposed methods) through a predefined signal (e.g., a physical-layer signal or a higher-layer signal).

As described above, the present disclosure proposes a method in which the UE transmits UL data (e.g., PUSCH) through an unlicensed band in a wireless communication system supporting the unlicensed band.

Figure 16:
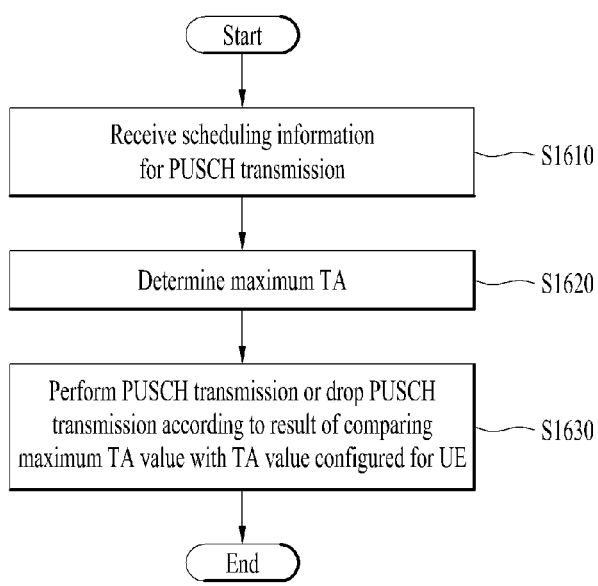
FIG. 16 is a flowchart of a UL data transmission of a UE according an example of the present disclosure.

FIG. 16 is a flowchart illustrating a UL data transmission method of a UE according to an example of the present disclosure.

First, the UE receives scheduling information for UL data (e.g., PUSCH) transmission through an unlicensed band from an eNB (S1610). The scheduling information includes first offset information received in a first subframe, second offset information received in a second subframe other than the first subframe, and starting position information of UL data transmission.

The starting position information of UL data transmission may be signaled in various manners. As an example, the starting position information of UL data transmission may be received together with the first offset information in the first subframe or may be received together with the second offset information in the second subframe. Alternatively, the starting position information of UL data transmission may be received through higher-layer signaling or additional signaling.

The staring position information of UL data transmission may indicate one of a total of 4 starting positions as a starting position of UL data transmission. A total of 4 starting positions is as follows.

symbol #0 boundary,
symbol #0 boundary+25 μs,
symbol #0 boundary+25 μs+TA value configured for the UE,
symbol #1 boundary.

Next, the UE determines a maximum TA value for the UE based on the first offset information, the second offset information, and the starting position information of UL data transmission (S1620).

In this case, the maximum TA value for the UE may be differently determined according to the transmission position of UL data transmission based on the first offset information, the second offset information, and the starting position information of UL data transmission.

More specifically, the transmission position of UL data transmission is determined to be a starting position indicated by the starting position information of UL data transmission within a third subframe after a time duration corresponding to the sum of a value indicated by the first offset information and a value indicated by the second offset information, based on the subframe in which the second offset information is received.

Then, the maximum TA value for the UE may be differently determined according to a time length from the second subframe to the starting position indicated by the starting position information of UL data transmission within the third subframe. As an example, as the time length from the second subframe to the starting position indicated by the starting position information of UL data transmission within the third subframe increases, the maximum TA for the UE may be set to have a large value.

Next, the UE compares the maximum TA value determined in step S1620 with a TA value configured for the UE to perform PUSCH transmission at a scheduled transmission starting position or drop PUSCH transmission (S1630). Specifically, if the maximum TA value is greater than or equal to the TA value configured for the UE, the UE may perform UL data transmission at the starting position indicated by the starting position information of UL data transmission within the third subframe. If the maximum TA value is less than the TA value configured for the UE, the UE may drop UL data transmission at the starting position indicated by the starting position information of UL data transmission within the third subframe.

Such a series of operations, particularly, maximum TA determination of step S1620 and the PUSCH transmission operation according to a result of comparison between the maximum TA value and the TA value configured for the UE in step S1630 may be applied to only the case in which the sum of a value indicated by the first offset information and a value indicated by the second offset information is greater than or equal to 1 and less than or equal to 3.

The above-described PUSCH transmission operation may include, as PUSCH transmission in an unlicensed band, a channel access procedure (e.g., LBT) of the UE and PUSCH transmission according to a result of the channel access procedure. In other words, when the UE performs PUSCH transmission at a predetermined timing in an unlicensed band, the UE may perform an operation of performing a channel access procedure for the unlicensed band at the predetermined timing and performing PUSCH transmission according to a result of performing channel access.

4. Apparatus Configuration

Figure 17:
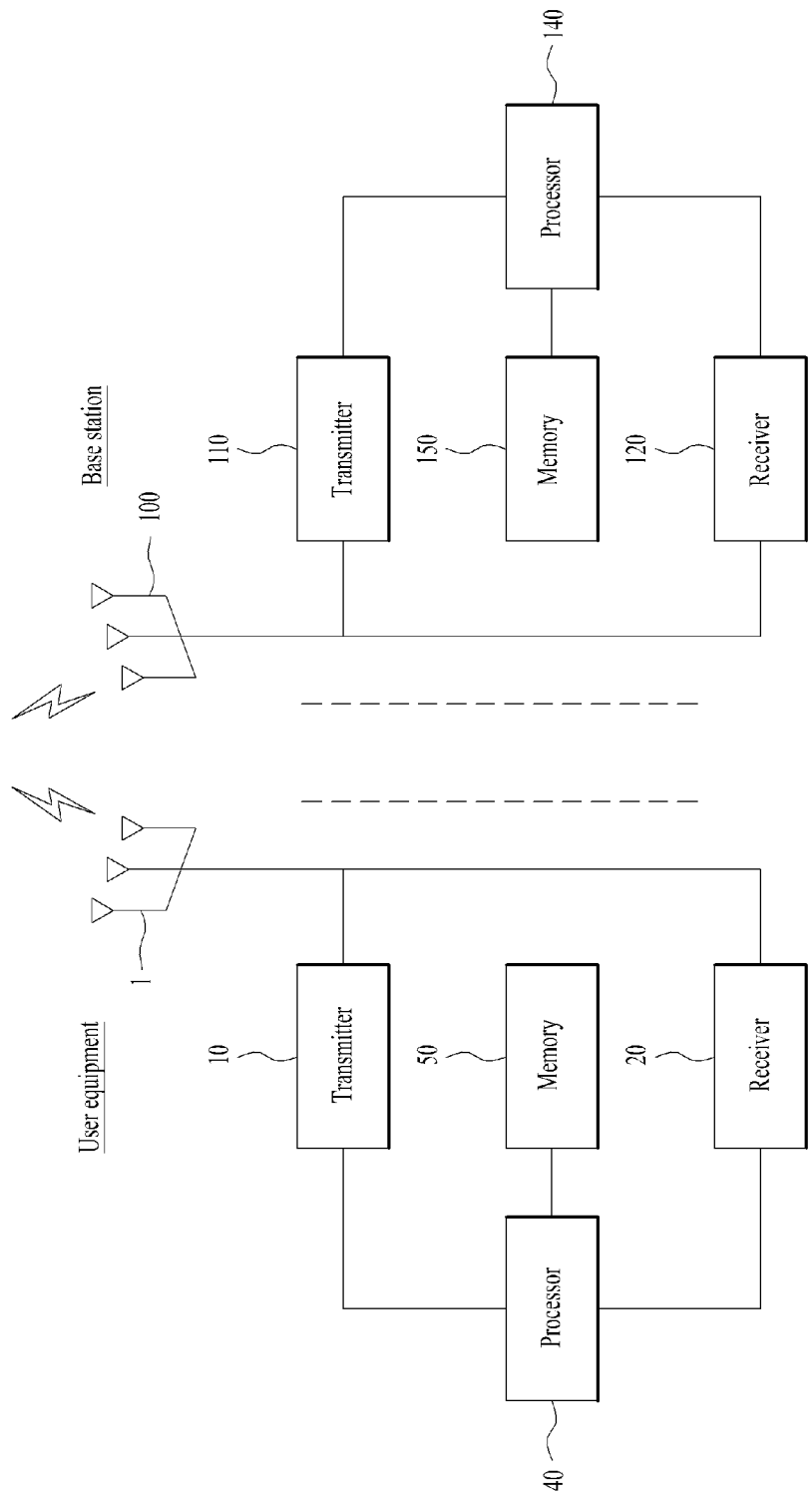
FIG. 17 is a diagram illustrating configurations of a UE and an eNB in which proposed embodiments can be implemented.

FIG. 17 is a diagram illustrating configurations of a UE and an eNB in which proposed embodiments can be implemented. The UE and the eNB illustrated in FIG. 17 operate to implement embodiments of the above-described UL data transmission and reception method in an unlicensed band.

A UE 1 may operate as a transmitter on UL and as a receiver on DL. An eNB 100 may operate the receiver on UL and as the transmitter on DL.

That is, the UE and the eNB may include transmitters 10 and 110 and receivers 20 and 120, respectively, to control transmission and reception of information, data, and/or messages and include antennas 30 and 130, respectively, to transmit and receive information, data, and/or messages.

The UE and eNB may include processors 40 and 140, respectively, to perform the embodiments of the present disclosure and memories 50 and 150, respectively, to temporarily or permanently a processing procedure of the processors.

The UE 1 configured in this way receives scheduling information for UL data transmission from the eNB 100. The scheduling information includes first offset information received in a first subframe, second offset information received in a second subframe other than the first subframe, and starting position information of UL data transmission. Next, the UE 1 determines a maximum TA value for the UE 1 through the processor 40 based on the first offset information, the second offset information, and the starting position information of UL data transmission. The UE performs or drops UL data transmission through an licensed band at a starting position indicated by the starting position information of UL data transmission within a third subframe determined based on the first offset information and the second offset information through the transmitter 10 according to a result of comparing the maximum TA value with a TA value configured for the UE 1.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting uplink (UL) data by a user equipment (UE) in a wireless communication system supporting an unlicensed band, the method comprising:
receiving scheduling information for UL data transmission,
wherein the scheduling information comprises first offset information received on a first time resource, second offset information received on a second time resource, and starting position information of the UL data transmission;
identifying a maximum timing advance (TA) value for the UE based on the first offset information, the second offset information, and the starting position information; and
performing the UL data transmission on the unlicensed band or dropping the UL data transmission, at a starting position related with the starting position information within a third time resource, based on a result of comparing the maximum TA value with a TA value configured to the UE,
wherein the third time resource is identified based on the first offset information and the second offset information.

2. The method of claim 1,
wherein the UL data is a physical uplink shared channel (PUSCH).

3. The method of claim 1,
wherein the starting position information informs, as a starting position of the UL data transmission, one of:
symbol #0 boundary,
symbol #0 boundary+25 µs,
symbol #0 boundary+25 µs+TA value configured to the UE, and symbol #1 boundary.

4. The method of claim 1,
wherein the third time resource is a time resource after a time duration from the second time resource,
wherein the time duration is related with the sum of a value related with the first offset information and a value related with the second offset information.

5. The method of claim 4,
wherein the maximum TA value for the UE is differently identified based on a time length from the second time resource to the starting position related with the starting position information within the third time resource.

6. The method of claim 5,
wherein, a time length from the second time resource to the starting position related with the starting position information within the third time resource increases, a value of the maximum TA for the UE increases.

7. The method of claim 1,
wherein performing the UL data transmission or dropping the UL data transmission comprises:
in case of the maximum TA value being greater than or equal to the TA value configured to the UE, performing the UL data transmission at the starting position related with the starting position information within the third time resource, and,
in case of the maximum TA value being less than the TA value configured to the UE, dropping the UL data transmission at the starting position related with the starting position information within the third time resource.

8. The method of claim 1,
wherein the sum of a value related with the first offset information and a value related with the second offset information is greater than or equal to 1 and less than or equal to 3.

9. The method of claim 1, further comprising:
in case of sounding reference signal (SRS) transmission being scheduled with the UL data transmission and the UL data transmission being dropped based on the result of comparing the maximum TA value with the TA value configured to the UE, performing scheduled SRS transmission regardless of dropping of the UL data transmission.

10. A user equipment (UE) for transmitting uplink (UL) data in a wireless communication system supporting an unlicensed band, the UE comprising:
a transmitter;
a receiver; and
at least one processor coupled with the transmitter and the receiver,
wherein the at least one processor is configured to:
receive scheduling information for UL data transmission,
wherein the scheduling information comprises first offset information received on a first time resource, second offset information received on a second time resource, and starting position information of the UL data transmission;
identify a maximum timing advance (TA) value for the UE based on the first offset information, the second offset information, and the starting position information; and
perform the UL data transmission on the unlicensed band or dropping the UL data transmission, at a starting position related with the starting position information within a third time resource, based on a result of comparing the maximum TA value with a TA value configured to the UE,
wherein the third time resource is identified based on the first offset information and the second offset information.

11. The UE of claim 10,
wherein the UL data is a physical uplink shared channel (PUSCH).

12. The UE of claim 10,
wherein the starting position information informs, as a starting position of the UL data transmission, one of:
symbol #0 boundary,
symbol #0 boundary+25 µs,
symbol #0 boundary+25 µs+TA value configured to the UE, and
symbol #1 boundary.

13. The UE of claim 10,
wherein the third time resource is a time resource after a time duration from the second time resource,
wherein the time duration is related with the sum of a value related with the first offset information and a value related with the second offset information.

14. The UE of claim 13,
wherein the maximum TA value for the UE is differently identified based on a time length from the second time resource to the starting position related with the starting position information within the third time resource.

15. The UE of claim 14,
wherein, a time length from the second time resource to the starting position related with the starting position information within the third time resource increases, a value of the maximum TA for the UE is increases.

16. The UE of claim 10, wherein the at least one processor is further configured to:
in case of the maximum TA value being greater than or equal to the TA value configured to the UE, perform the UL data transmission at the starting position related with the starting position information within the third time resource, and,
in case of the maximum TA value being less than the TA value configured to the UE, drop the UL data transmission at the starting position related with the starting position information within the third time resource.

17. The UE of claim 10,
wherein the sum of a value related with the first offset information and a value related with the second offset information is greater than or equal to 1 and less than or equal to 3.

18. The UE of claim 10, wherein the at least one processor is further configured to:
in case of sounding reference signal (SRS) transmission being scheduled with the UL data transmission and the UL data transmission being dropped based on the result of comparing the maximum TA value with the TA value configured to the UE, perform scheduled SRS transmission regardless of dropping of the UL data transmission.

* * * * *